US008743392B2

(12) United States Patent
Uchida

(10) Patent No.: US 8,743,392 B2
(45) Date of Patent: Jun. 3, 2014

(54) APPARATUS, METHOD, AND COMPUTER PROGRAM PRODUCT FOR FORMING IMAGES

(75) Inventor: Fukutoshi Uchida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 478 days.

(21) Appl. No.: 12/560,021

(22) Filed: Sep. 15, 2009

(65) Prior Publication Data
US 2010/0067028 A1    Mar. 18, 2010

(30) Foreign Application Priority Data

Sep. 16, 2008 (JP) ................................ 2008-237129

(51) Int. Cl.
*G06F 15/00* (2006.01)
(52) U.S. Cl.
USPC .......... 358/1.15; 358/1.16; 358/404; 358/448
(58) Field of Classification Search
None
See application file for complete search history.

(56) References Cited

U.S. PATENT DOCUMENTS

| | | | |
|---|---|---|---|
| 6,301,010 B1 * | 10/2001 | Kajita | ........................... 358/1.13 |
| 7,228,081 B2 | 6/2007 | Hasegawa et al. | |
| 7,251,420 B2 | 7/2007 | Fujimori et al. | |
| 7,260,335 B2 | 8/2007 | Kato et al. | |
| 7,493,058 B2 | 2/2009 | Takeuchi et al. | |
| 7,548,704 B2 | 6/2009 | Hasegawa et al. | |
| 7,551,866 B2 | 6/2009 | Watanabe et al. | |
| 2006/0274628 A1 | 12/2006 | Tanaka et al. | |
| 2007/0025748 A1 | 2/2007 | Ishibashi et al. | |
| 2007/0047015 A1 * | 3/2007 | Yamada | ........................ 358/404 |
| 2007/0065164 A1 | 3/2007 | Fujimori et al. | |
| 2007/0104499 A1 | 5/2007 | Ariizumi et al. | |
| 2007/0110455 A1 | 5/2007 | Ariizumi et al. | |
| 2007/0188824 A1 * | 8/2007 | Imamichi | ........................ 358/448 |
| 2008/0025742 A1 | 1/2008 | Kato et al. | |
| 2008/0068657 A1 * | 3/2008 | Uchida et al. | ................. 358/1.16 |
| 2008/0239380 A1 * | 10/2008 | Takahashi | .................... 358/1.15 |

FOREIGN PATENT DOCUMENTS

| | | |
|---|---|---|
| JP | 5-336385 | 12/1993 |
| JP | 7-175916 | 7/1995 |
| JP | 10-74163 | 3/1998 |
| JP | 2006-270896 | 10/2006 |
| JP | 2007-325251 | 12/2007 |
| JP | 2008-73895 | 4/2008 |

OTHER PUBLICATIONS

Japanese Office Action issued Dec. 4, 2012, in Japan Patent Application No. 2008-237129.

* cited by examiner

*Primary Examiner* — Vincent Rudolph
*Assistant Examiner* — Helen Q Zong
(74) *Attorney, Agent, or Firm* — Oblon, Spivak, McClelland, Maier & Neustadt, L.L.P.

(57) ABSTRACT

An image forming apparatus includes plural input filter sections controlling different types of input-processing performed by corresponding input devices to produce respective input image data sets each having a different input format, plural output filter sections controlling different types of output-processing performed by corresponding output devices that receive respective output image data sets each having a different output format, and an image processing section being made sharable by any given one of the input filter sections and any given one of the output filter sections, and converting an image data set from an input format of the one of the input filter sections to an output format of the one of the output filter sections.

16 Claims, 20 Drawing Sheets

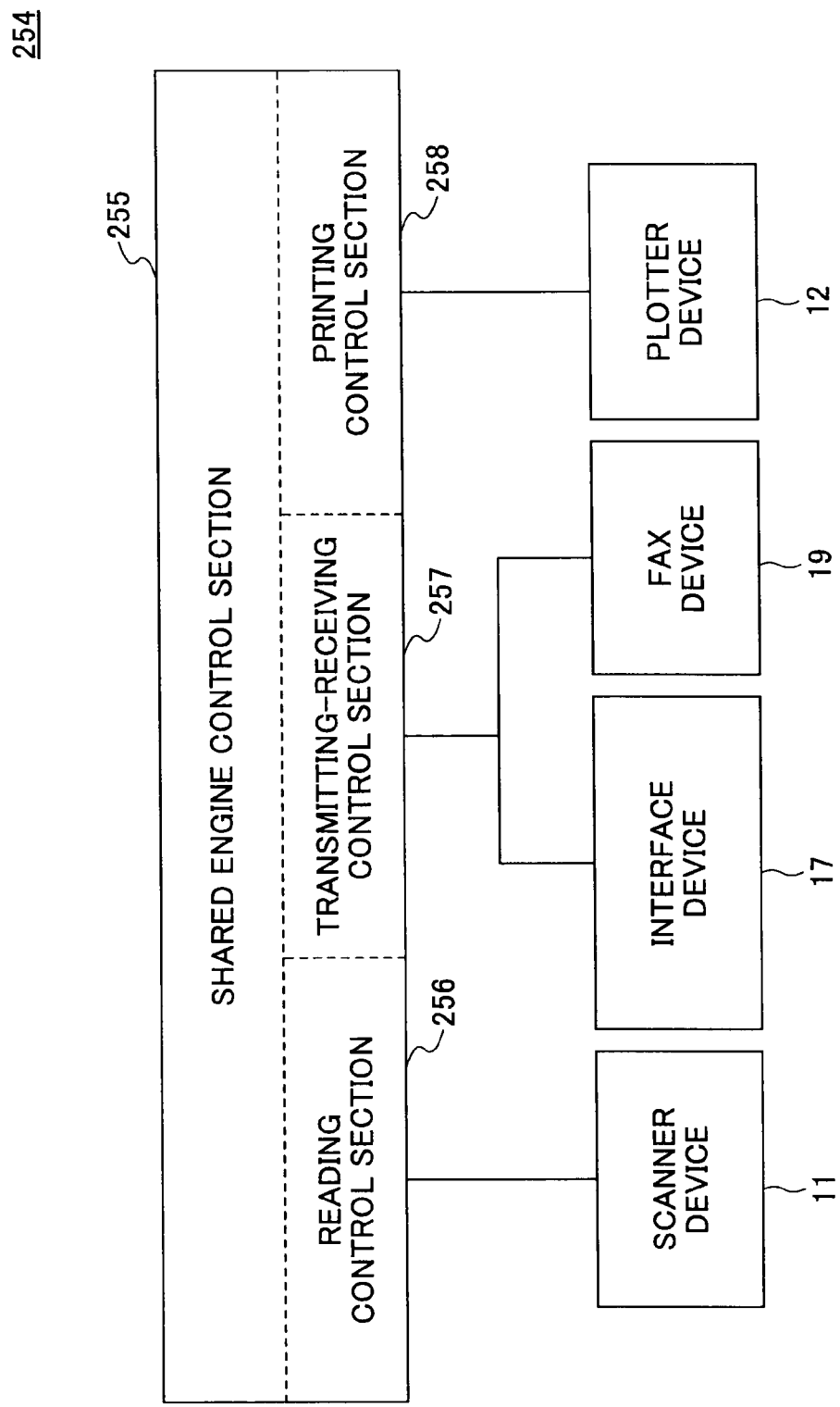

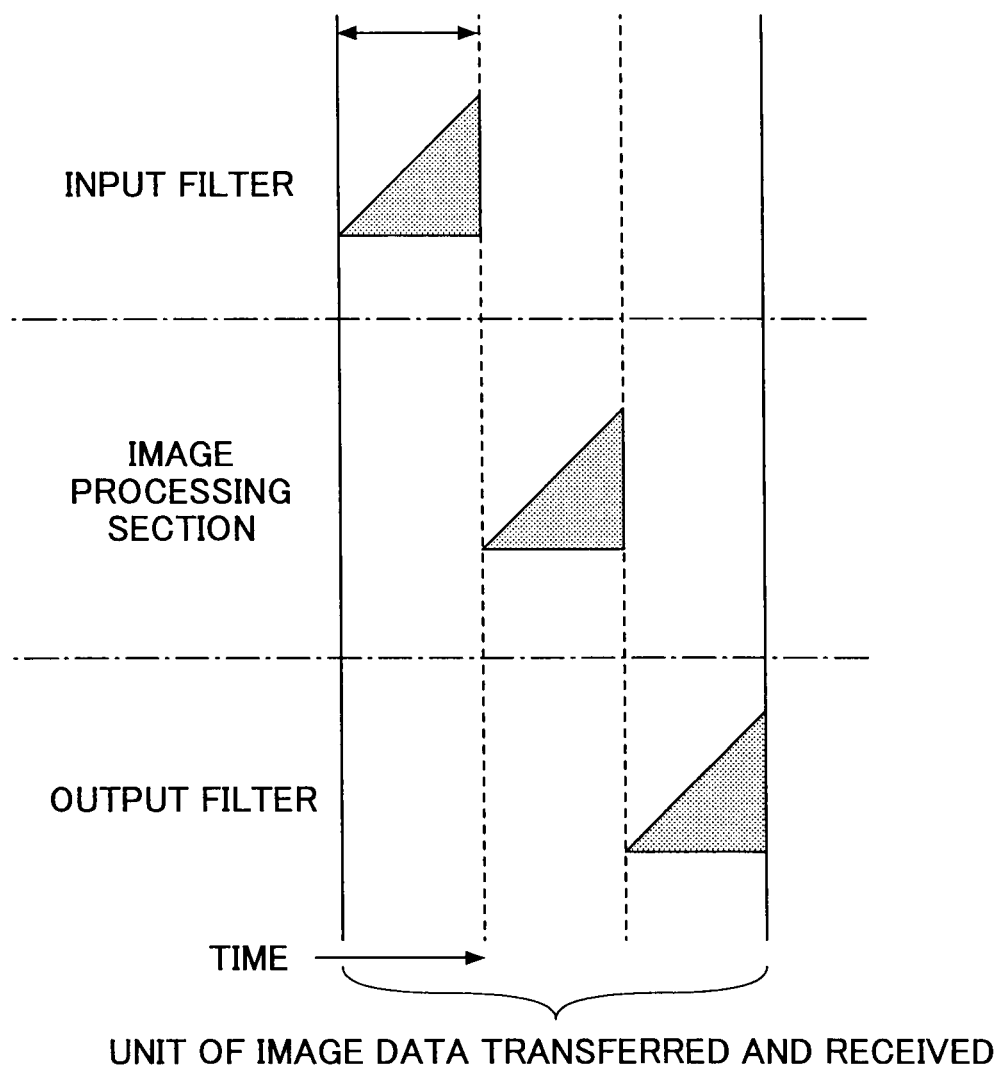

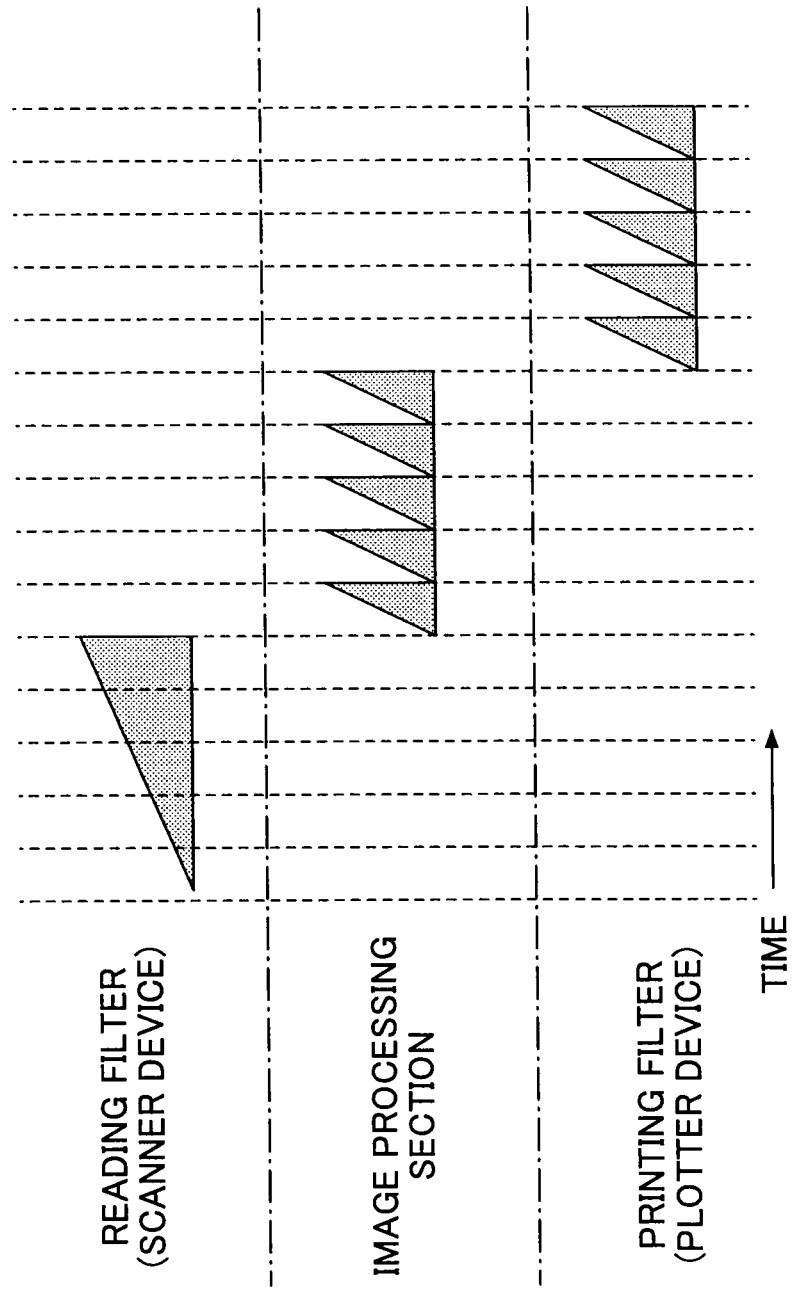

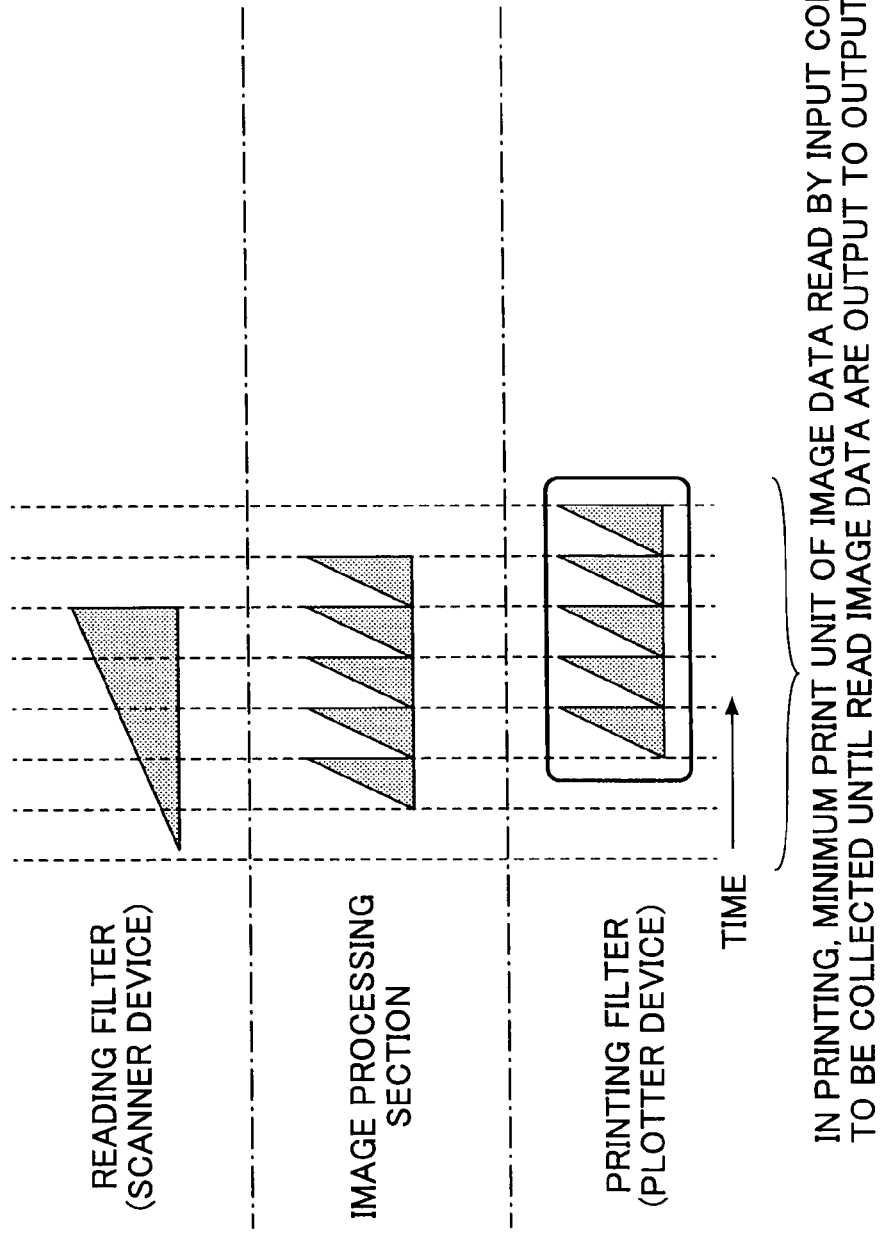

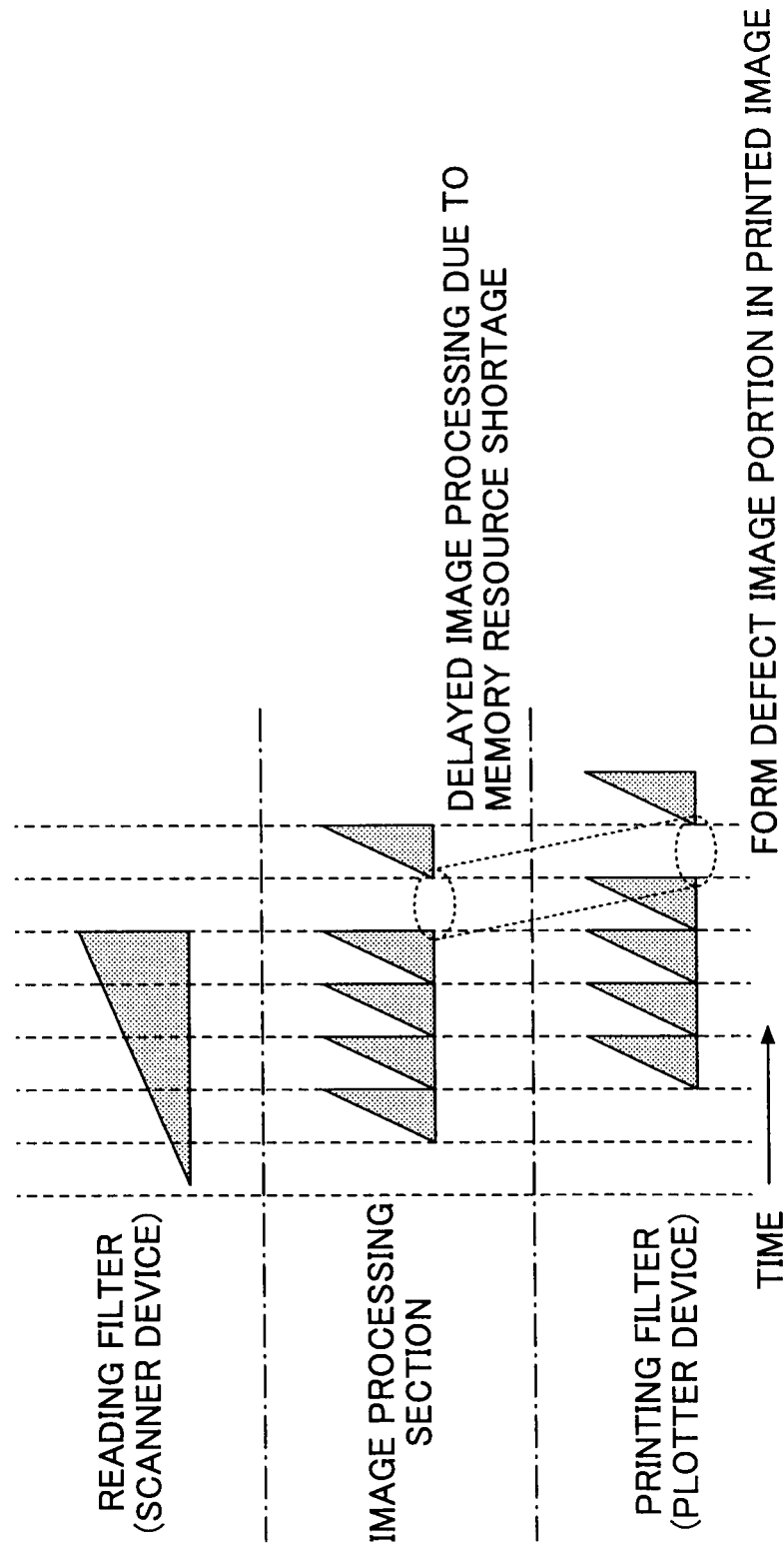

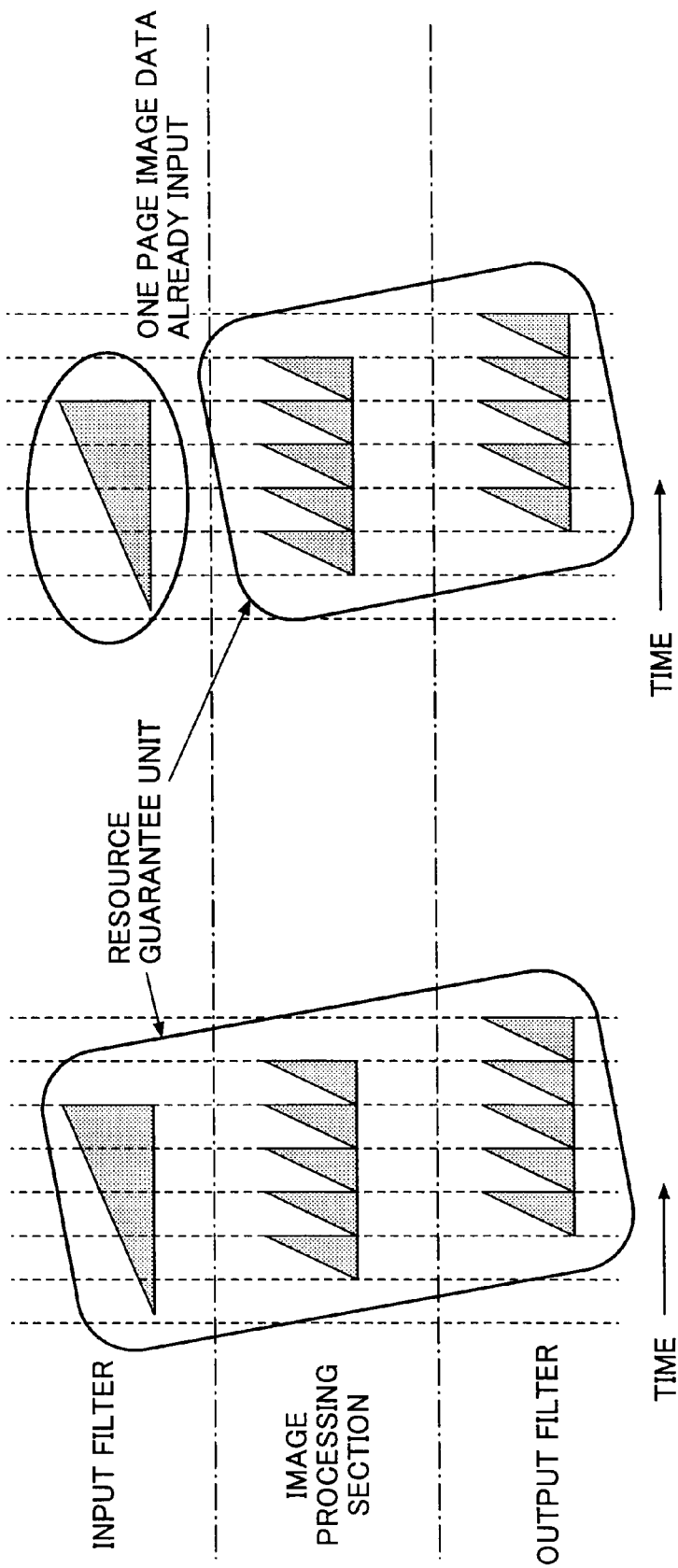

FIG.14

| | RETRIEVE STORED DOCUMENT | READ | RECEIVE FAX | PROCESSING | REGISTER STORED DOCUMENT | PRINT | TRANSMIT FAX | TRANSMIT MAIL |
|---|---|---|---|---|---|---|---|---|
| SIMULTANEOUSLY PROCESSING PLURAL IMAGES | BOTH | BOTH | BOTH | PARALLEL ONLY | BOTH | BOTH | BOTH | BOTH |
| SEQUENTIALLY AND REPEATEDLY PROCESSING PLURAL IMAGES | BOTH | BOTH | BOTH | BOTH | BOTH | PARALLEL ONLY | BOTH | BOTH |

*BOTH --- BOTH SYNCHRONOUS AND PARALLEL CONTROL SYSTEMS ARE APPLICABLE
PARALLEL ONLY --- SYNCHRONOUS CONTROL SYSTEM IS NOT APPLICABLE

APPARATUS, METHOD, AND COMPUTER PROGRAM PRODUCT FOR FORMING IMAGES

BACKGROUND OF THE INVENTION

1. Field of the Invention

The present invention generally relates to an apparatus, a method, and a computer program product for forming images, and more specifically, to an apparatus, a method, and a computer program product for forming images in which an application is formed by connecting an input controller to an output controller.

2. Description of the Related Art

In recent image forming apparatuses, for example, as disclosed in Japanese Patent Application Laid-Open No. 2007-325251, customization and extension of functions are simplified by the application of a pipe-and-filter architecture to software configuration. Such an image forming apparatus to which the pipe-and-filter architecture is applied includes an input filter configured to input image data, a process filter configured to process the image data, and an output filter configured to output the image data. In the image forming apparatus, an application is formed by the combinations of filters having different functions connected via pipes each transferring the image data output from one filter to another.

Thus, in the image forming apparatus, the customization and extension of functions can be achieved by simply changing, adding, or deleting some of the filters corresponding to the functions.

In a case where one function such as a copy function is executed, a reading filter representing one of the input filters, a process filter processing the image data read by the reading filter, and a printing filter representing one of the output filters are connected to thereby execute the copy function, that is, to execute a sequence of processing from reading to printing the image data. Or, in a case where another function such as facsimile (FAX) function is executed, the reading filter, the process filter, and a fax filter representing one of the output filters are connected to thereby execute the FAX function, that is, to execute a sequence of processing from reading to faxing the image data.

However, in the aforementioned related art image forming apparatus, data formats of the image data processed by the filters unfortunately differ between types of the functions (i.e., applications).

For example, when the image forming apparatus receives a copying request, the filters process the image data output from the printing filter in a CMYK color format. When the image forming apparatus receives a fax request, the filters process the image data output from the fax filter in an MMR format.

Accordingly, when the related art image forming apparatus receives different types of requests to execute data processing, each of the filters needs to discriminate a particular type of data processing requested, and convert one image data having one data format into another image data having another data format suitable for the requested data processing type. Accordingly, in executing the data processing, the filters selected and connected via pipes for the particular type of data processing need to have a common data format, and are hence dependent on one another according to the related-art image forming apparatus. That is, if one filter has been changed to another type due to, for example, the change of the request, the other filters connected via pipes need to change their conversion contents (i.e., data format) accordingly. Thus, one filter may not operate independently of others.

SUMMARY OF THE INVENTION

Embodiments of the present invention may provide a novel and useful apparatus, method, and computer program product for forming images in which the filters can operate independently of one another in data processing.

According to an embodiment of the invention, there is provided an image forming apparatus including a plurality of input filter sections configured to control different types of input-processing performed by corresponding input devices to produce respective input image data sets each having a different input format, a plurality of output filter sections configured to control different types of output-processing performed by corresponding output devices that receive respective output image data sets each having a different output format, and an image processing section configured to be made sharable by any given one of the input filter sections and any given one of the output filter sections, and convert an image data set from an input format of the one of the input filter sections to an output format of the one of the output filter sections.

According to an embodiment of the invention, there is provided a method for forming an image in an image forming apparatus having a plurality of input filter sections controlling different types of input-processing performed by corresponding input devices to produce respective image data sets each having a different input format and a plurality of output filter sections controlling different types of output-processing performed by corresponding output devices that receive respective output image data sets each having a different output format. The method includes carrying out one of the different types of input-processing by a corresponding one of the input filter sections to produce an input image data set having a corresponding input format, converting the input image data set from the corresponding input format of the one of the input filter sections to a requested output format of one of the output filter sections, and carrying out one of the different types of output-processing by a corresponding one of the output filter sections that receive an output image data set having the requested output format.

According to an embodiment of the invention, there is provided a computer program product having instructions embedded therein which, when executed by a processor, cause an image forming apparatus having a plurality of input filter sections controlling different types of input-processing performed by corresponding input devices to produce respective image data sets each having a different input format and a plurality of output filter sections controlling different types of output-processing performed by corresponding output devices that receive respective output image data sets each having a different output format. The method includes carrying out one of the different types of input-processing by a corresponding one of the input filter sections to produce an input image data set having a corresponding input format, converting the input image data set from the corresponding input format of the one of the input filter sections to a requested output format of one of the output filter sections, and carrying out one of the different types of output-processing by a corresponding one of the output filter sections that receive an output image data set having the requested output format.

Additional objects and advantages of the embodiments will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

FIG. 5 is a diagram illustrating a detailed configuration of an engine control section in the device service layer;

FIG. 7 is a diagram illustrating a process in which an image data set received from an input filter is transferred to an image processing section, and the transferred image data set is further transferred to an output filter in a block, band, or page unit in the image forming apparatus according to the embodiment of the invention;

FIGS. 8A and 8B are diagrams each illustrating a process in which an image data set received from an input filter is transferred to an image processing section, and the transferred image data set is further transferred to an output filter when a printing request is executed;

FIG. 9 is a diagram illustrating one example of an image defect portion generated due to the delay of collecting segments of the image data set;

FIG. 10 is a diagram illustrating a process in which a resource for an image data set is guaranteed in image data units;

FIG. 14 is one example of a table indicating types of a control system in relation to types of data processing;

DETAILED DESCRIPTION OF THE PREFERRED EMBODIMENTS

An image forming apparatus according to an embodiment of the invention includes a shared image processing section configured to convert an image data set having one data format into an image data set having another data format (c.f., in the related art image forming apparatus, this conversion process is performed by each of the filters according to types of data processing). The shared image processing section is provided so that the data format can be converted at the shared image processing section, and the filters are not used for the data format conversion. In this manner, the filters can operate independently of one another without being involved in keeping data format type consistency (i.e., filters are no more dependent on one another). As a result, the functions of the image forming apparatus can be simply customized and extended.

The image forming apparatus according to the embodiment of the invention further includes a memory so that a resource for carrying out the image processing can be secured regardless of application types. Accordingly, an image data set having one data format can be converted efficiently into another image data set having another data format consuming only a small amount of the memory.

Embodiments

Figure 1:
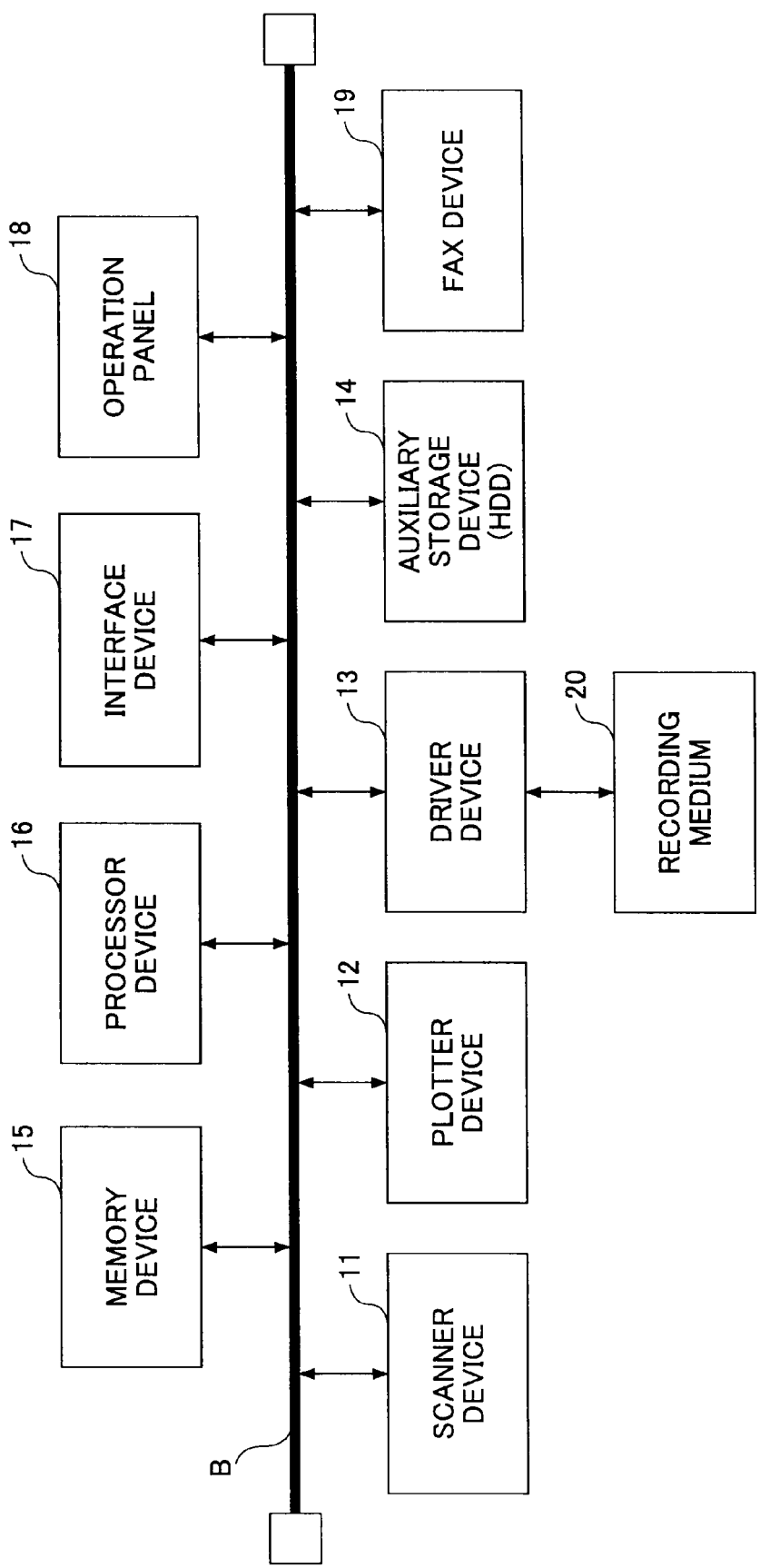
FIG. 1 is a diagram illustrating a configuration of an image forming apparatus according to an embodiment of the invention.

A description is given below, with reference to FIGS. 1 through 18 of embodiments of the present invention. FIG. 1 is a diagram illustrating a configuration of an image forming apparatus 100 according to the embodiment of the invention.

FIG. 1 illustrates one example of a hardware configuration of the image forming apparatus 100 according to the embodiment of the invention. The image forming apparatus 100 includes a scanner device 11, a plotter device 12, a driver device 13, an auxiliary storage device (hereinafter also called "HDD") 14, a memory device 15, a processor device 16, and an interface device 17. These components are mutually connected via a bus B.

The scanner device 11 scans a paper-based document so as to input an image data set into the image forming apparatus 100. The plotter device 12 prints the image data set onto a recording medium such as a printer sheet to output the printer sheet printed with the image data set. The interface device 17 includes a modem and a LAN card utilized for connecting the image forming apparatus 100 to a telephone line or to networks. The interface device 17 transmits (outputs) and receives (inputs) the image data set via the networks. An operation panel 18 is utilized for a user to operate the image forming apparatus 100, an example of which is a touch-sensitive panel having a display function. A FAX device 19 is utilized for transmitting (outputting) the image data set over the telephone line to an external device via the interface device 17.

An image forming program product according to an embodiment of the invention includes programs that control the image formation device 100. The programs for the image forming apparatus (hereinafter also called "image forming program(s)") may be distributed via a recording medium 20 or downloaded via the networks. Various types of recording media may be used as the recording medium 20 storing the image forming programs. Examples of such recording media include a magneto-optical disk, that is, a recording medium on which information is optically and electrically or magnetically recorded, a CD-ROM and a flexible disk, and a ROM or a flash memory, that is, a semiconductor memory on which information is electrically recorded.

When the recording medium 20 storing the image forming programs is placed in the driver device 13, the image forming programs are installed on the HDD 14 from the recording medium 20 via the driver device 13. The image forming programs downloaded via the networks are installed on the HDD 14 via the interface device 17.

The HDD 14 stores files and data, and the like along with the image forming programs. The memory device 15 retrieves the image forming programs from the HDD 14 and stores the programs in the memory device 15 during a computer's start-up process. The processor device 16 carries out various types of processing described later based on the image forming programs stored in the memory device 15.

Figure 2:
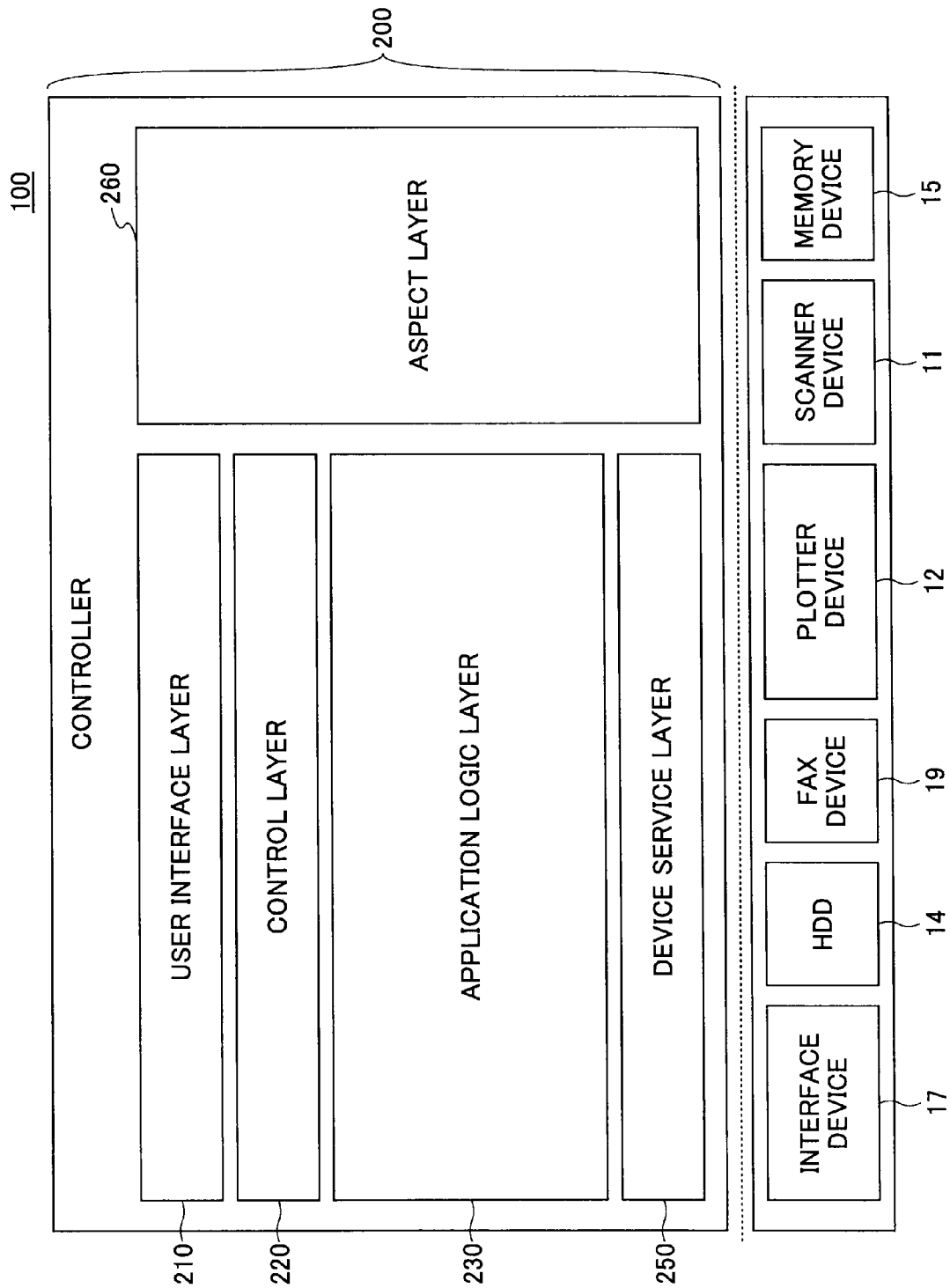
FIG. 2 is a diagram illustrating a software configuration of the image forming apparatus according to the embodiment of the invention.

FIG. 2 is a diagram illustrating a software configuration of the image forming apparatus 100 according to the embodiment of the invention. In the image forming apparatus 100, computer hardware of the image forming apparatus 100 (i.e., physical components of a computer system) is controlled by a controller 200 that is computer software utilized for controlling the operation of the image forming apparatus 100 (i.e., the image forming programs), thereby carrying out various functions of the image forming apparatus 100.

The controller 200 includes a user interface layer 210, a control layer 220, an application logic layer 230, a device service layer 250, and an aspect layer 260.

The user interface layer 210 receives requests from a user of the image forming apparatus 100 or via the networks connected to the image forming apparatus 100. The user interface layer 210 transfers the received requests to the control layer 220.

The control layer 220 combines filters contained in the application logic layer 230 described later so as to carry out the requests received by the user interface layer 210.

The application logic layer 230 contains a filter group that carries out a part of functions served by the image forming apparatus 100. In the image forming apparatus 100, the control layer 220 combines filters contained in the application logic layer 230 to construct an application to attain a function. Details of the application logic layer 230 are described later.

The device service layer 250 contains program modules that control the hardware (devices). The device service layer 250 is utilized by the application logic layer 230. Details of the device service layer 250 are described later.

The aspect layer 260 controls logic of the aforementioned layers. Functions of the logic include, for example, management in an access control, a usage history and an accounting based on the usage history in the image forming apparatus 100.

Figure 3:
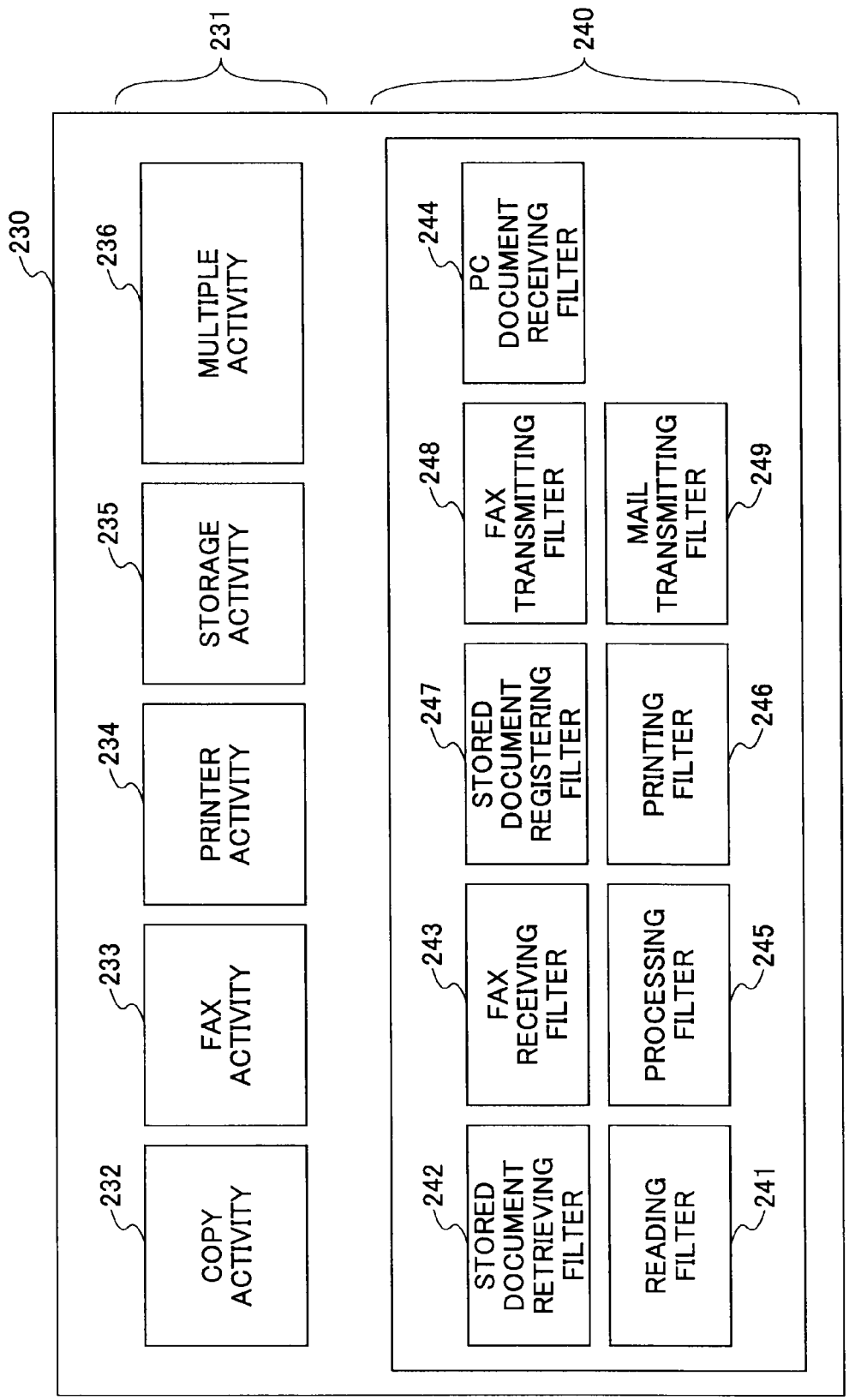
FIG. 3 is a diagram illustrating a configuration of an application logic layer in the software configuration.

FIG. 3 is a diagram illustrating the application logic layer 230 in the software configuration. The application logic layer 230 includes an activity group 231 that is one type of a filter, and a function providing filter group 240.

The activity group 231 connects the filters combined by the control layer 220 to execute processing. The activity group 231 includes a copy activity 232, a FAX activity 233, a printer activity 234, a storage activity 235, and a multiple activity 236.

The function providing filter group 240 includes a reading filter 241, a stored document retrieving filter 242, a FAX receiving filter 243, a PC document receiving filter 244, a processing filter 245 that process the image data set input from the input filter as input filters, and a printing filter 246, a stored document registering filter 247, a FAX transmitting filter 248, and a mail transmitting filter 249 as output filters.

The reading filter 241 provides a function to read a paper-based document via the scanner device 11. The stored document retrieving filter 242 provides a function to retrieve a data set stored in a permanent region such as the HDD 14. The FAX receiving filter 243 provides a function to retrieve a data set received over the telephone line. The processing filter 245 provides a function to process the image data set input from the input filter. The printing filter 246 provides a function to output the image data set from the plotter device 12. The stored document registering filter 247 provides a function to store the data set input from the input filter in the permanent region. The FAX transmitting filter 248 provides a function to transmit the input data set over the telephone line. The mail transmitting filter 249 provides a function to transmit the input data set via the networks.

The copy activity 232 combines the reading filter 241, the processing filter 245, and the printing filter 246 to thereby attain a copying request. The FAX activity 233 combines the FAX receiving filter 243, and the FAX transmitting filter 243 or the printing filter 246 to thereby attain a FAX request. The printer activity 234 combines the PC document receiving filter 244 and the printing filter 246 to thereby attain a printing request. The storage activity 235 combines one of the reading filter 241, the FAX receiving filter 243 and the PC document receiving filter 244 with the stored document registering filter 247 to thereby attain a document storage request. The multiple activity 236 combines the filters contained in the function providing filter group 240 to thereby attain various requests.

Figure 4:
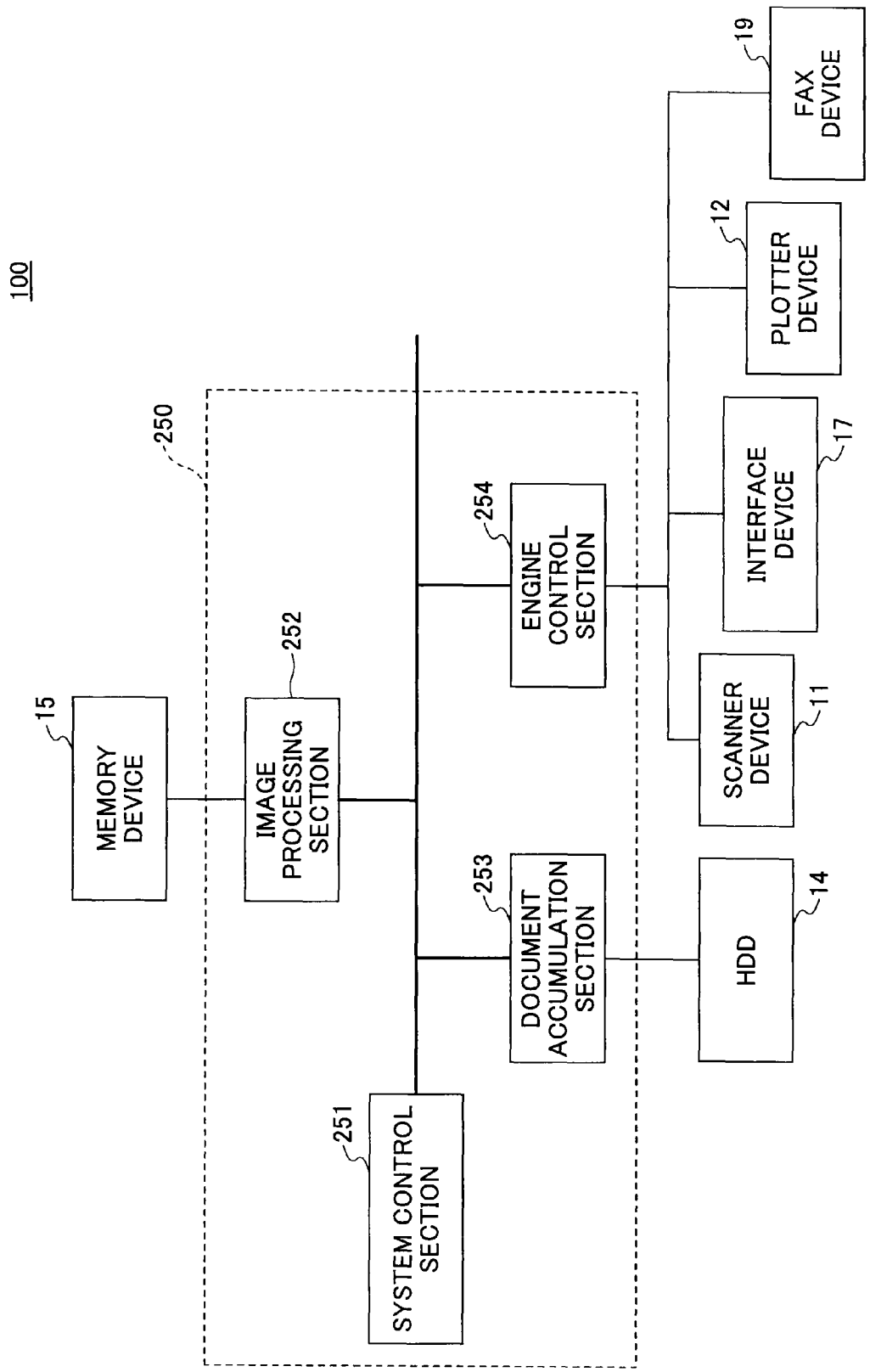
FIG. 4 is a diagram illustrating a configuration of a device service layer in the software configuration.

FIG. 4 is a diagram illustrating the device service layer 250 in the software configuration according to the embodiment of the invention.

The device service layer 250 includes a system control section 251, an image processing section 252, a document accumulation section 253, and an engine control section 254.

The system control section 251 controls an entire operation of the device service layer 250. The image processing section 252 is connected to the memory device 15 to control the memory device 15. The image processing section 252 converts an image data set having one data format input from the input filter into another image data set having another data format, so that the image can be output from the output filter. This conversion is hereinafter called "image conversion process". The image processing section 252 carries out the image conversion process on the image data set in accordance with instructions given by the filters. The image processing section 252 according to the embodiment of the invention carries out the image conversion process on the image data set using a shared memory 151 provided in the memory device 15. Details of the shared memory 151 and the image conversion process are described later.

The document accumulation section 253 is connected to the HDD 14. The document accumulation section 253 accumulates image data sets that are to be stored permanently in the HDD 14. The document accumulation section 253 also retrieves image data sets accumulated in the HDD 14.

The engine control section 254 is connected to the scanner device 11, the plotter device 12, the interface device 17, and the FAX device 19 so as to control these devices.

FIG. 5 is a diagram illustrating a detailed configuration of the engine control section 254 in the device service layer 250.

The engine control section 254 includes a shared engine control section 255, a reading control section 256, a transmitting-receiving control section 257, and a printing control section 258.

The shared engine control section 255 controls the engine control section 254. The reading control section 256 controls the scanner device 11. The transmitting-receiving control section 257 controls data transmission or reception in the interface device 17 and the FAX device 19. The printing control section 258 controls the plotter device 12.

Figure 6A:
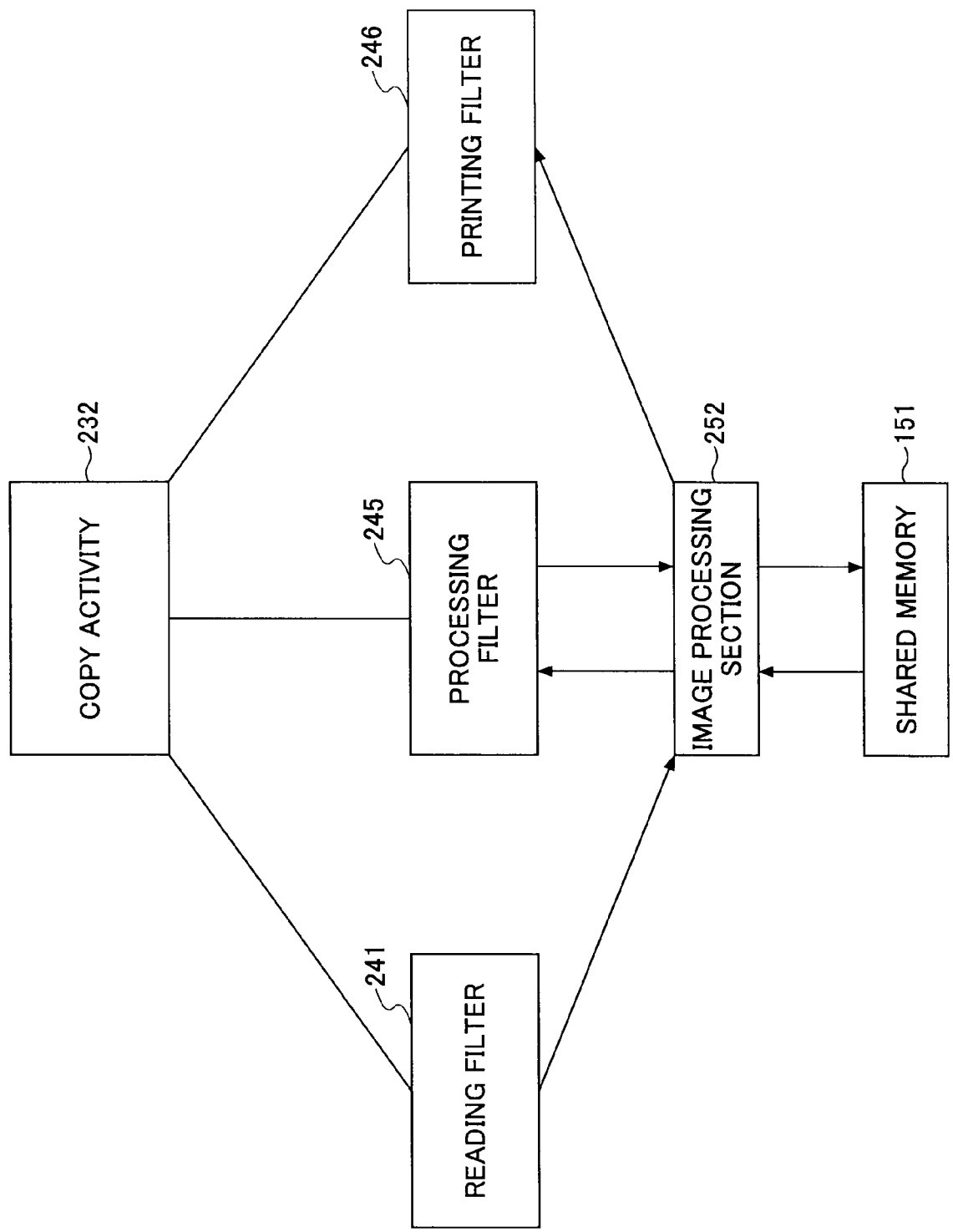
FIGS. 6A and 6B are schematic diagrams each illustrating an operation of the image forming apparatus according to the embodiment of the invention.
Figure 6B:
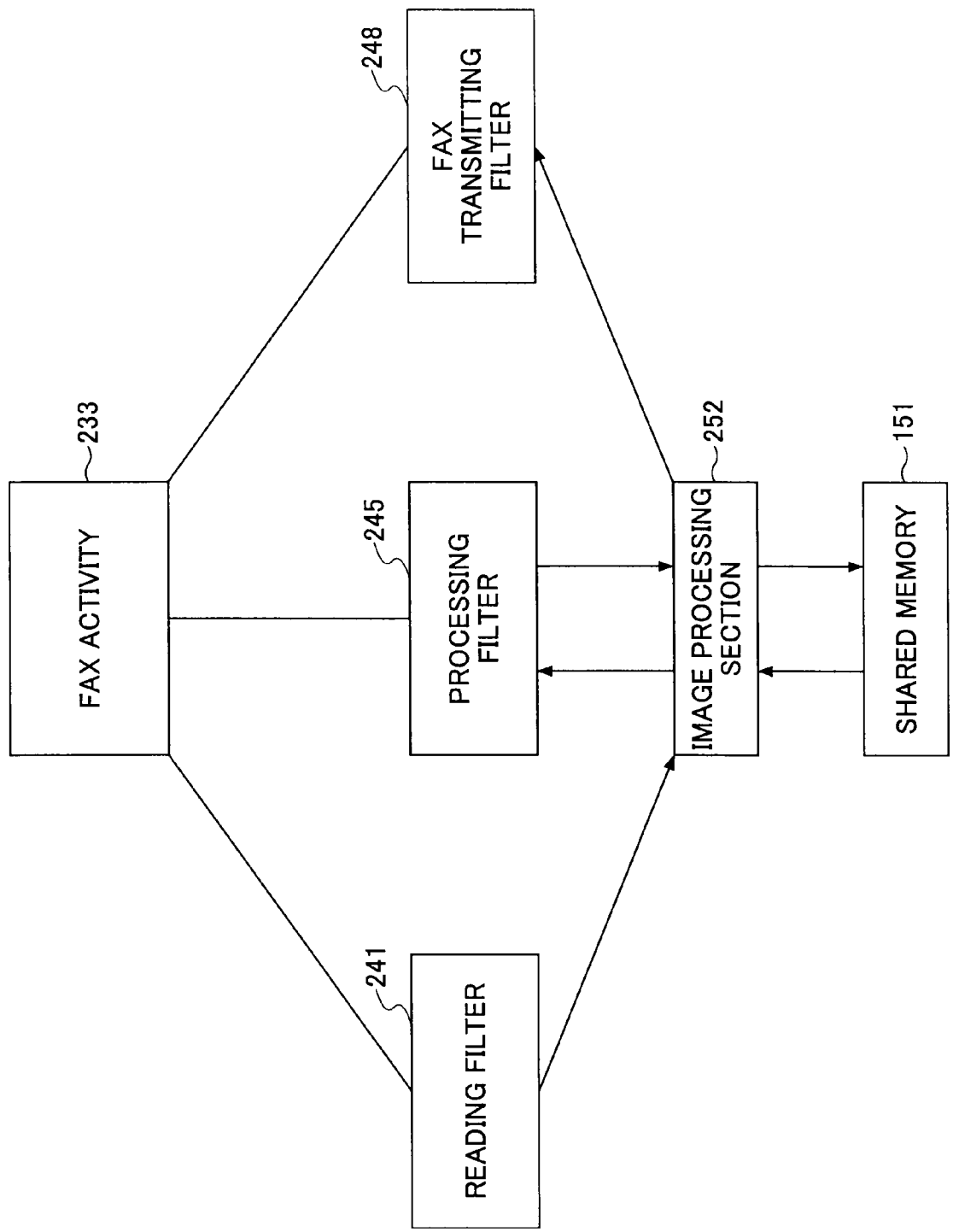

Referring to FIGS. 6A and 6B, an outline of the operation of the image forming apparatus 100 according to the embodiment of the invention is described. Since the image forming apparatus 100 according to the embodiment of the invention includes the image processing section 252, the image conversion process can be carried out by the image processing section 252 alone, unlike the related art where an image conversion process is carried out by each of the filters in the image forming apparatus.

FIGS. 6A and 6B are schematic diagrams each illustrating the operation of the image forming apparatus 100 according to the embodiment of the invention. FIG. 6A illustrates the operation of the image forming apparatus 100 according to the embodiment when receiving a copying request, and FIG. 6B illustrates an operation thereof when receiving a FAX request.

As illustrated in FIG. 6A, when the image forming apparatus 100 receives a copying request, the copy activity 232 connects to the reading filter 241, the processing filter 245, and the printing filter 246. The reading filter 241 scans a document via the scanner device 11, converts the scanned document into an image data set, and transfers the image data set accompanied with information on the type of request to the image processing section 252.

The type of request in FIG. 6A is a "copying" request. The image processing section 252 determines that the transferred image data set can be processed in the CMYK format based on the transferred request type (here, "copying" request). Thereafter, the image processing section 252 converts the image data set having a format transferred from the reading filter 241 into an image data set having the CMYK format by writing (storing) the received data set in the shared memory 151 and retrieving the stored data from the shared memory 151.

The shared memory 151 provided in the memory device 15 indicates a memory region in which data are written (stored) or from which the data are read (retrieved) by the image processing section 252 while the image processing section 252 carries out the image conversion process. In the image forming apparatus 100 according to the embodiment, the image processing section 252 writes data in and reads data from the shared memory 151 while carrying out the image conversion process regardless of request types. The image processing section 252 then transfers the CMYK formatted (converted) image data to the processing filter 245.

On receiving the image data set having the CMYK format from the image processing section 252, the processing filter 245 processes the received image data set and transfers the processed image data set to the image processing section 252. Specifically, the processing filter 245 carries out the processing on the received image data set, such as rotation, scale-down, scale-up, and aggregation of the image data set. On receiving the processed image data set from the processing filter 245, the image processing section 252 transfers the processed image data set to the printing filter 246. Thereafter, the printing filter 246 outputs the transferred image data set by use of the plotter device 12.

Referring now to FIG. 6B, when the image forming apparatus 100 receives a FAX request, the FAX activity 233 connects to the reading filter 241, the processing filter 245, and the FAX transmitting filter 248. The reading filter 241 scans a document via the scanner device 11, converts the scanned document into an image data set, and transfers the image data set accompanied with information on the type of request to the image processing section 252.

In FIG. 6B, the image processing section 252 determines that the image data set can be processed in the "MMR" format based on the request type of a "fax transmission" request. The image processing section 252 converts the image data set having a format transferred from the reading filter 241 into an image data set having the MMR format by writing (storing) the received data set in the shared memory 151 and retrieving the stored data from the shared memory 151. The image processing section 252 then transfers the MMR formatted (converted) image data set to the processing filter 245. The processing filter 245 processes the received image data set having the MMR format and transfers the processed image data set having the MMR format to the image processing section 252, which in turn, transfers the processed image data set having the MMR format to the FAX transmitting filter 248 as similar to that shown in FIG. 6A.

Accordingly, each of the filters simply transfers the image data set along with the accompanying information on the request type to the image processing section 252, and need not carry out any type of processing of the image conversion process itself.

In the example, the input filter carries out processing, such as, "transfer the image data set to the image processing section 252 on receiving the image data set". Likewise, the processing filter 245 carries out processing, such as, "process the image data set transferred from the image processing section 252 and transfer the processed image data set to the image processing section 252". Further, the output filter carries out processing, such as, "output the image data set transferred from the image processing section 252 without modification".

In this manner, the filters do not operate dependent on one another but rather operate independently of one another.

In the image forming apparatus 100 according to the embodiment, since the image conversion process is carried out by writing (storing) data in and reading (retrieving) data from the shared memory 151 regardless of types of requests, the capacity of the memory provided in the image forming apparatus 100 may be made to be small. Thus, the image forming apparatus 100 may be manufactured at low cost.

Below, a process in which the image conversion process is controlled by the shared memory 151 is described.

First, a process in which an image data set subjected to the image conversion process is received from the input filter, transferred from the input filter to the image processing section, and further transferred from the image processing section to the output filter is described. FIG. 7 is a diagram illustrating a process in which an image data set received from an input filter is transferred to an image processing section, and the transferred image data set is further transferred to an output filter in the image forming apparatus 100 according to the embodiment of the invention.

In the image forming apparatus 100, when the input filter inputs an image data set, the input filter stores the input image data set to a memory resource (i.e., shared memory 151) until it has received all data (complete image data set). Likewise, when the image processing section 252 converts the image data set input by the input filter, the image processing section 252 carries out a conversion process on the image data set received from the input filter by writing (storing) the image data set in and reading (retrieving) the stored image data set from the shared memory 151. When the output filter outputs the converted image data set, the output filter retrieves the converted image data set from the shared memory 151 via the image processing section 252. Note that the processing filter is, in practice, connected between the input filter and the output filter, so that the image data set is also received or transferred between the processing filter and the image processing section. However, the descriptions thereof are omitted from FIG. 7. Further, description of the transfer and reception of the image data set between the processing filter and the image processing section are also omitted from the following descriptions.

The image processing section 252 according to the embodiment will not initiate the image conversion process until a minimum processible image unit of the image data set is transferred from the input filter. Likewise, the output filter will not initiate the output processing until a minimum processible image unit of the image data set is formed.

The minimum processible image unit of the image data set varies according to the type of, for example, the input filter and the output filter. For example, a block unit of the image data set is the minimum processible image unit of the image data set in a transmission-reception type of filter. An input filter transmission-reception type of filter includes, for example, the FAX receiving filter 243 and the PC document receiving filter 244. An output filter transmission-reception type of filter includes, for example, the FAX transmitting filter 248 and the mail transmitting filter 249.

The FAX receiving filter 243 and the FAX transmitting filter 248 cause the transmitting-receiving control section 257 to control the FAX device 19 in the engine control section 254 to thereby transmit and receive the image data set. Likewise, the PC document receiving filter 244 and the mail transmitting filter 249 cause the transmitting-receiving control section 257 to control the interface device 17 to thereby transmit and receive the image data set.

In a case where the reading filter 241 is selected as the input filter and the printing filter 246 is as the output filter, a band unit is determined to be the minimum processible image unit. The reading filter 241 causes the reading control section 256 in the engine control section 254 to control the scanner device 11 to thereby scan the image data set. The printing filter 246 controls the plotter device 12 to print the image data set.

In a case where the stored document retrieving filter 242 is the input filter and the stored document registering filter 247 is the output filter, a page unit is determined to be the minimum processible image unit. The stored document retrieving filter 242 and the stored document registering filter 247 control the document accumulation section 253 to input the image data set to or output the image data set from the HDD 14.

FIGS. 8A and 8B are diagrams each illustrating a process in which an image data set received from an input filter is transferred to an image processing section, and the transferred image data set is further transferred to an output filter or received when a printing request is executed. FIG. 8A depicts a first example of a process in which the image data set is received from a reading filter (scanner device), transferred from the reading filter to the image processing section, and further transferred from the image processing section to a printing filter (plotter device) when the printing request is executed, and FIG. 8B depicts a second example of a process in which the image data set is received from a reading filter (scanner device), transferred from the reading filter to the image processing section, and further transferred from the image processing section to a printing filter (plotter device) when the printing request is executed.

FIG. 8A shows an example in which the image data set is processed in a page unit. In this example, when the reading filter 241 causes the scanner device 11 to scan the image data set in a page unit, the scanned a page image data set is transferred to the image processing section 252. Thereafter, when the image processing section 252 carries out the image conversion process on the image data set in the page unit, the converted image data set in the page unit is transferred to the printing filter 246 to thereby output the transferred image data set in the page unit from the plotter device 12.

FIG. 8B shows an example in which the image data set is processed in the minimum processible image unit of a band unit. In this example, when the image data set in a band unit is scanned by the scanner device 11, the scanned image data set in the band unit is transferred to the image processing section 252. The image processing section 252 carries out the image conversion process on the scanned image data set in the band unit and transfers the converted image data set in the band unit to the printing filter 246. The printing filter 246 initiates the plotter device 12 to print the transferred the image data set in the band unit. In the example of FIG. 8B, a series of processing is carried out without a time gap (i.e., delay). Since the series of processing on the image data set are sequentially carried out without a time gap, the transfer and reception of the image data set in the band unit may take shorter time than those in a page unit.

In a case where the image data set is divided into segments and the segments of the image data set are received from the reading filter (scanner device), transferred from the reading filter to the image processing section, and further transferred from the image processing section to the printing filter (plotter device) as shown in the example of FIG. 8B, it is desirable to guarantee that all the segments of the image data set corresponding to the original image data set ultimately be collected. In the example of FIG. 8B, it is desirable to guarantee that all the segments of the image data set corresponding to a page ultimately be collected. There are two cases in guaranteeing the collecting of all segments of an image data set: (1) a case where all the segments of the image data set need to be collected without delay; and (2) a case where all the segments of the image data set may ultimately be collected despite the delay in arrival of some segments of the image data set (hereinafter such delay is also called "image data delay").

The image data delay is caused due to lack of resources, such as the image processing section 252, and the memory 151 so that there is a delay before processing can be carried out. In order to collect all the segments of the image data set without the image data delay, the resources such as the image processing section 252, the memory 151, and the like need to be secured.

Examples of the case where all the segments of the image data set need to be collected without the image data delay include cases where output modes are a printing mode, a document storing mode, and the like.

If the output mode is the printing mode, all the segments of the image data set for a page need to be sequentially output to the printing filter 246 (plotter device 12) without the image data delay. Otherwise, a delayed segment of the image data set results in an abnormal image portion (image defect) appearing in the output image (printed image) as shown in FIG. 9. FIG. 9 is a diagram illustrating an example of the image defect portion when the arrival of some segments of the image data set is delayed.

If the output mode is the document storing mode, the image processing section 252 and the stored document registering filter 247 need to collect the segments of the original image data set for a page (a page unit) such that the output image (storing image) includes no image defect. Note that in this case, the input filter has already obtained the entire image data set. FIG. 10 is a diagram illustrating a process in which the image data set is guaranteed in an image data unit.

Examples of the case where all the segments of the image data set are ultimately collected despite the delay in arrival of some image data segments include a case where the output mode is a FAX transmission mode, and the like.

According to the embodiment of the invention, the delay in receiving the image data segments from a reading filter (scanner device), transferring the image data segments from the reading filter to the image processing section, and further transferring the image data segments from the image processing section to the printing filter (plotter) can be prevented by securing resources such as the image processing section 252 or the shared memory 151.

Below, a process in which resources are secured in the embodiment of the invention is described.

The engine control section 254 according to the embodiment of the invention secures resources in two types of control systems in receiving the image data set from the reading filter, transferring the image data set from the reading filter to the image processing section, and further transferring from the image processing section to the printing section. The two types of control systems are hereinafter called a "synchronous control system" and a "parallel control system".

The synchronous control system herein is defined as a control system in which one process is synchronized with another process. In the synchronous control system, the input device is activated in synchronization with the output device. Specifically, according to this embodiment, the scanner device 11 operates in synchronization with the plotter device 12 while the image data set is input to the scanner device 11 and output to the plotter device 12. In the synchronous control system, a set of the image data segments is received from the input filter, transferred from the input filter to the image processing section 252, and further transferred from the image processing section 252 to the output filter without a time gap (i.e., without image data delay) between the input filter, the image processing section 252, and the output filter.

The parallel control system herein is defined as a control system in which one process is deactivated when another process is activated. In the parallel control system, the scanner device 11 is deactivated when the plotter device is activated to be in operation. According to this embodiment, since all the segments of the image data set have already been input to the input filter, it is possible to process all the input segments of the image data set repeatedly after the scanner device 11 is deactivated. Specifically, in the parallel control system, having received a set of image data segments from the scanner device 11, the scanner device is deactivated, and the set of image data segments transferred to the image processing section 252 are repeatedly processed to be transferred to the output filter without a time gap between the image processing section 252 and the output filter.

Figure 11:
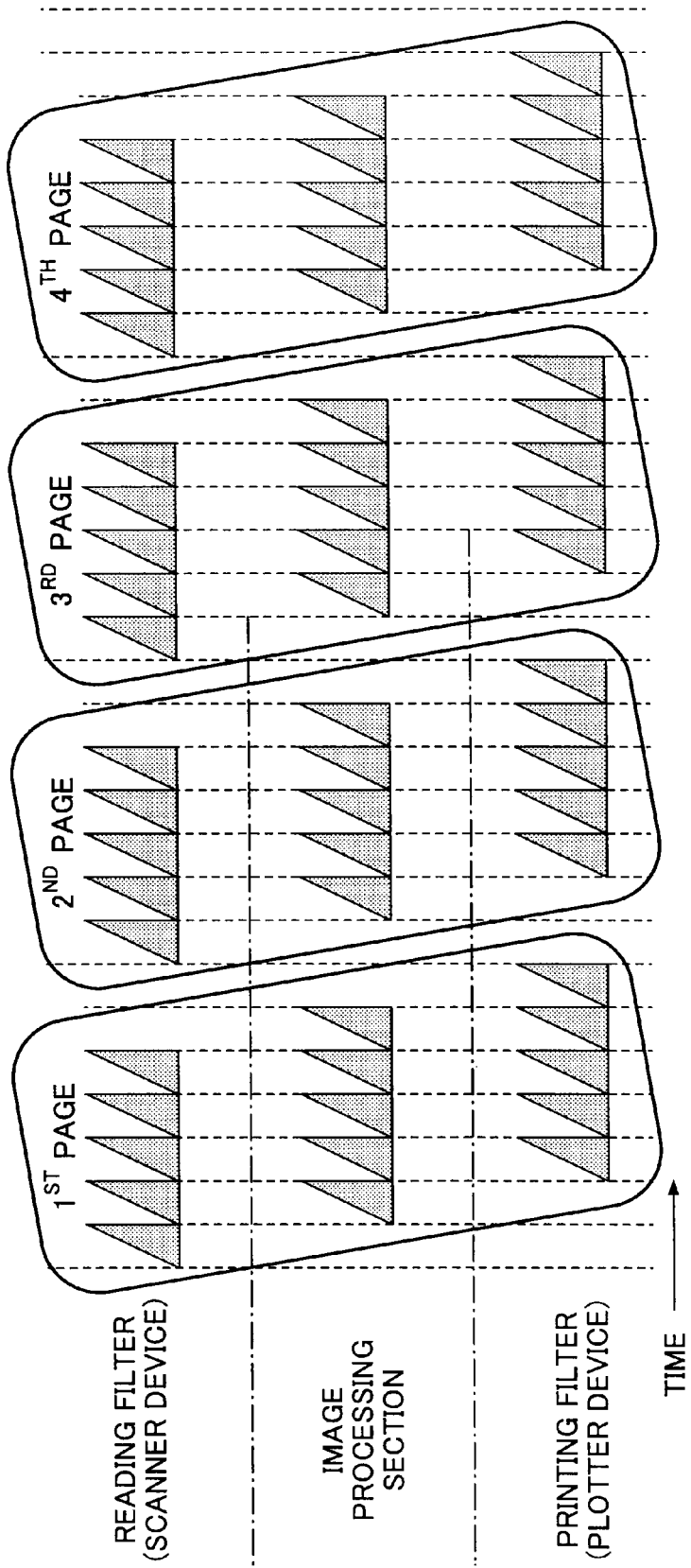
FIG. 11 is a diagram illustrating one example of a synchronous control system.
Figure 12:
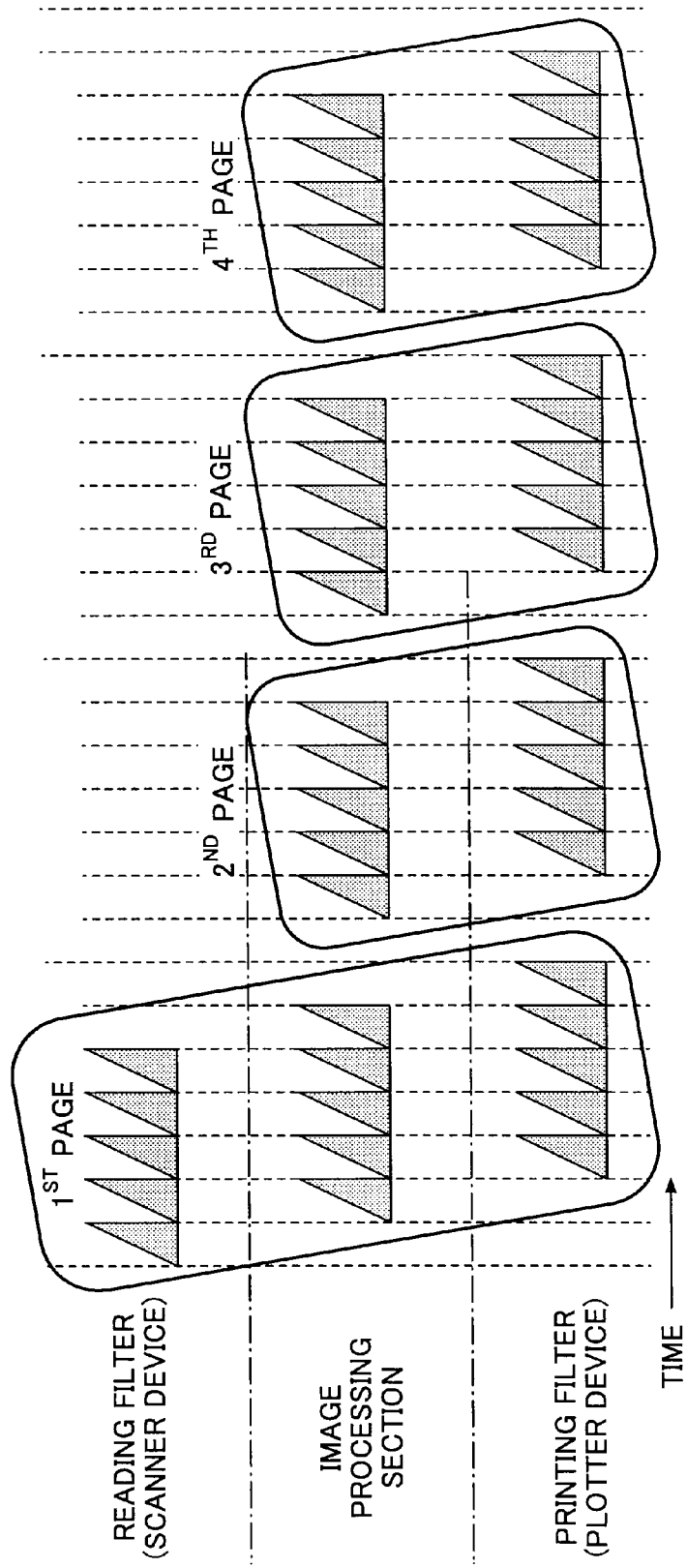
FIG. 12 is a diagram illustrating one example of a parallel control system.
Figure 13:
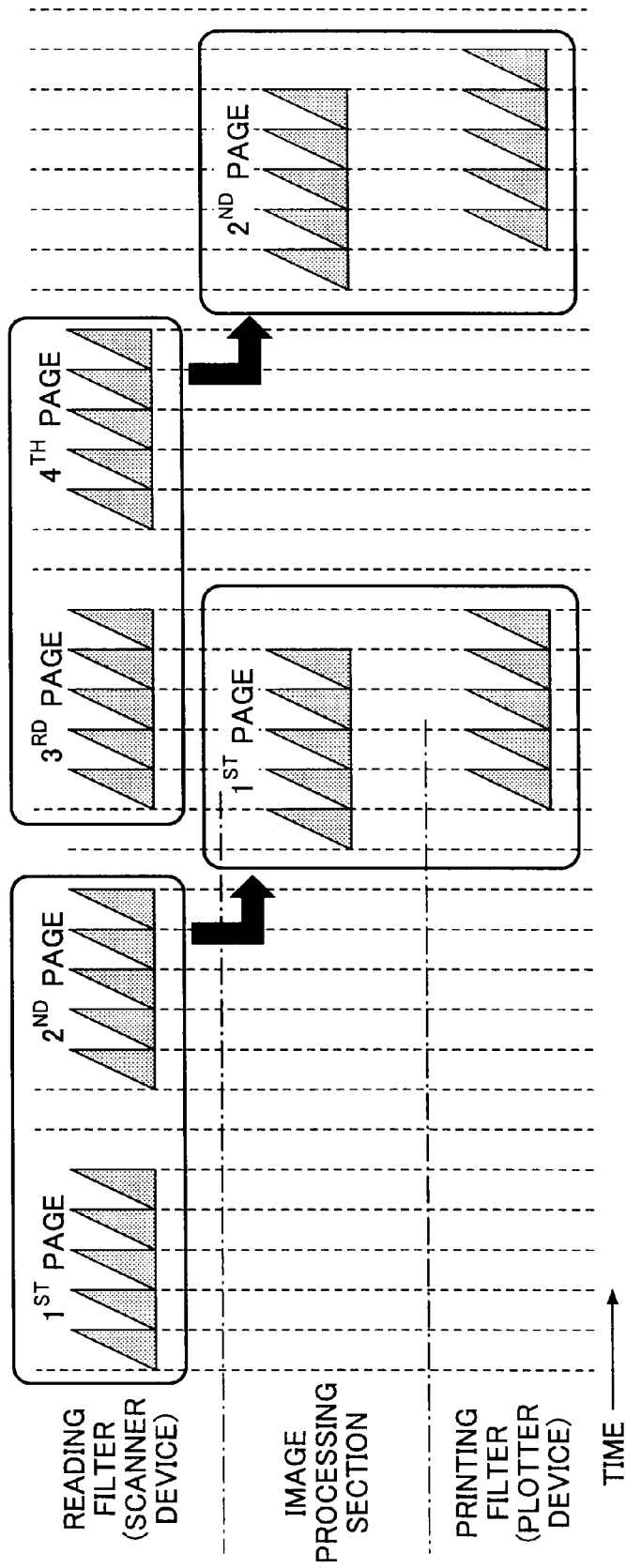
FIG. 13 is a diagram illustrating another example of a parallel control system.

Referring to FIGS. 11 to 13, the synchronous and parallel control systems are described by examples.

FIG. 11 is a diagram illustrating an example of a synchronous control system. In the example in FIG. 11, an image is output in response to an image input when the copying request is executed (1 output image from 1 input image). In FIG. 11, the scanner device 11 scans a page of a document, and the plotter device 12 outputs (prints) a page of the scanned document image data set on a sheet of transferring paper. Since the scanned image data set is processed in the synchronous system, a set of segments of the scanned image data set is received by the scanner device 11, and transferred from the input filter to the image processing section 252, and further transferred from the image processing section 252 to the plotter device 12 without a time gap (i.e., image data delay) between the input filter, the image processing section 252, and the output filter.

FIG. 12 is a diagram illustrating an example of a parallel control system. In the example in FIG. 12, an image is repeatedly output when a copying request is executed (N output images from 1 input image). In FIG. 12, the scanner device 11 scans a page of a document, and the plotter device 12 repeatedly outputs (prints out) a page of the scanned document image data set on respective plural sheets of transferring paper. In this case, for the first page, the scanner device 11 operates in synchronization with the plotter device 12 (synchronous control system) while transferring the image data set from the scanner device 11 to the plotter device 12. However, from the second page onwards, the image data set is already obtained by the input filter (scanner device 11). The image processing section 252 and the printing filter 246 (plotter device 12) operate in parallel with the input filter (scanner device 11).

FIG. 13 is a diagram illustrating another example of a parallel control system. In the example of FIG. 13, plural input images are output as an image (2 input images aggregated in 1 output image). In FIG. 13, two documents are scanned by the scanner device 11, the scanned two document images are converted into an aggregated image (2 in 1) by the image processing section 252, and the aggregated image (converted image data set) is printed (output) on a sheet of transferring paper. In this case, the scanner device 11 scans the images. Thereafter, the image processing section 252 and the plotter device 12 initiate processing at the time they have received the number of pages required. Since the image data set is already obtained by the input filter (scanner device 11), this example of FIG. 13 also demonstrates the parallel control system.

In the image forming apparatus 100 according to the embodiment of the invention, a table containing information on processing types in relation to the synchronous control system or the parallel control system can be stored in the HDD 14, or the like. FIG. 14 is an example of a table illustrating the two control systems corresponding to the processing types.

According to this embodiment, when plural sets of images need to be simultaneously processed; that is, when plural pages of the image data set are aggregated in one page as shown in a table T of FIG. 14, the synchronous control system is not applied to the processing filter 245 (processing filter 245 does not operate in the synchronous control system). When plural pages of the image data set are aggregated in a page to be printed, the parallel control system is applied to the image processing section 252 and the plotter device 12 (image processing section 252 and plotter device 12 operate in the parallel control system).

When plural image data sets are repeatedly processed; that is, when an input image is output (printed) as plural image data sets, the synchronous control system is not applied to the printing filter 246 (printing filter 246 does not operate in the synchronous control system). When two copies are made from a document, the parallel control system is applied to the image processing section 252 and the plotter device 12 (image processing section 252 and plotter device 12 operate in the parallel control system).

Figure 15:
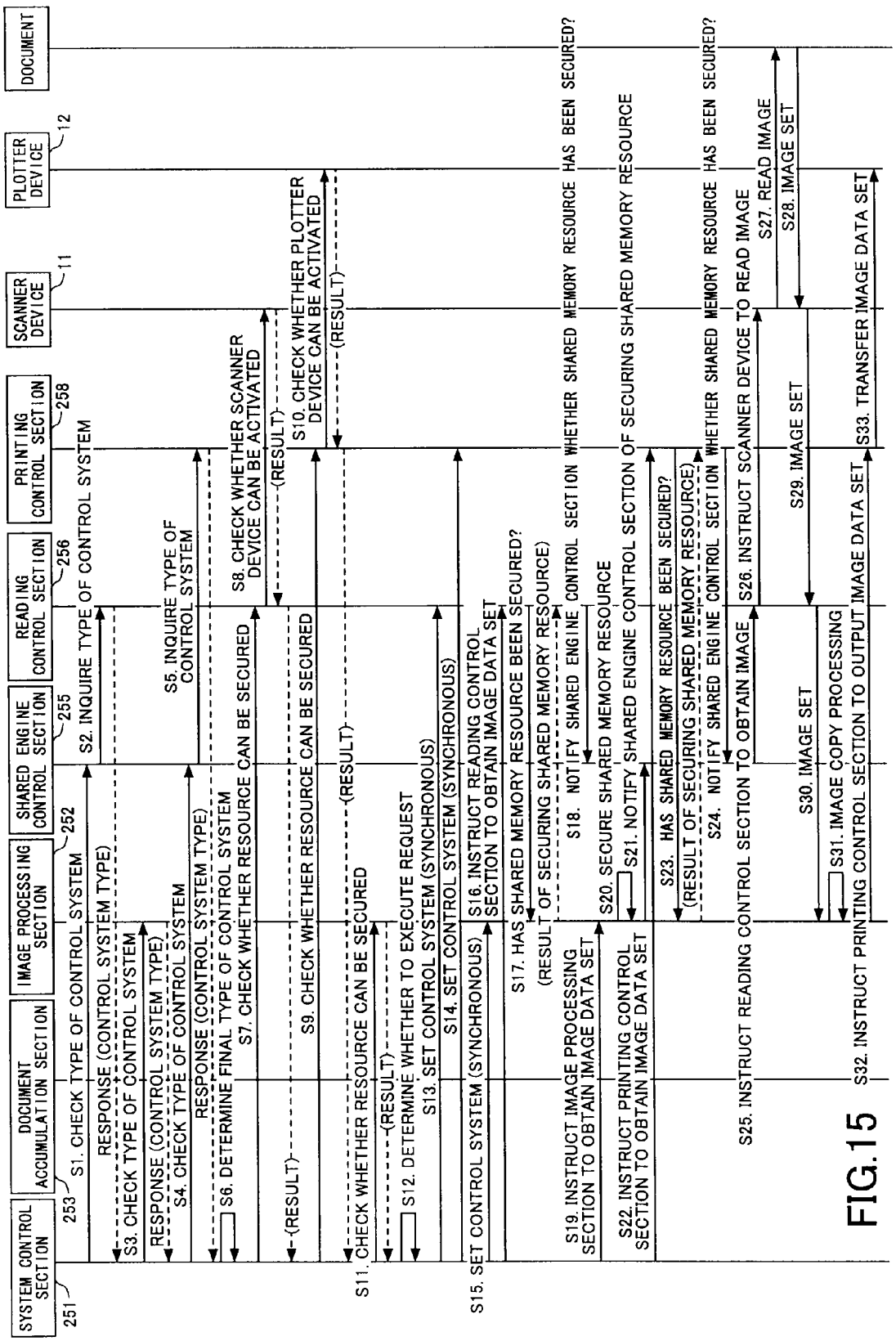
FIG. 15 is a sequence diagram illustrating process operations of the image forming apparatus according to the embodiment of the invention.

Below, operation of the image forming apparatus 100 according to the embodiment is described with reference to FIG. 15. FIG. 15 is a sequence diagram illustrating a sequence of operations of the image forming apparatus 100 according to the embodiment of the invention.

The sequence diagram in FIG. 15 illustrates a sequence of operations of the image forming apparatus 100 when the image forming apparatus 100 executes a copying request.

When the image forming apparatus 100 receives a copying request, the reading filter 241, the processing filter 245, and the printing filter 246 are combined via the control layer 220. In particular, these filters are combined by the copy activity 232 in the application logic layer 230. Thereafter, the copying request is transmitted to the system control section 251 in the device service layer 250.

On receiving the copying request, the system control section 251 inquires of the reading control section 256 via the shared engine control section 255 of the engine control section 254 about the type of control system suitable for the scanner device 11 (Steps S1 and S2). The system control section 251 inquires of the image processing section 252 transferring or receiving the image data about the type of the control system (Step S3). The system control section 251 inquires of the printing control section 258 via the shared engine control section 255 about the type of the control system of the plotter device 12 (Steps S4 and S5). The system control section 251 finally determines the type of control system that is best suited to the system control section 251 based on the results (responses) of inquires made at steps S1 to S5 (Step S6). Details of the process in which the final type of the control system is determined by the system control section 251 are described later.

Referring still to FIG. 15, provided that the synchronous system is determined as the type of the control system at step 6, subsequent processing is described below.

The system control section 251 inquires of the reading control section 256 as to whether a resource can be secured (Step S7). The reading control section 256 checks as to whether the scanner device 11 can be activated (Step S8), and the obtained result is returned to the system control section 251 (response). The system control section 251 inquires of the printing control section 258 as to whether a resource can be secured (Step S9). The printing control section 258 checks as to whether the plotter device 12 can be activated (Step S10), and the obtained result is returned to the system control section 251 (response). The system control section 251 inquires of the image processing section 252 as to whether a resource can be secured (Step S11). The image processing section 252 checks as to whether the shared memory 151 (see FIGS. 6A and 6B) has available space, and the obtained result is returned to the system control section 251.

The system control section 251 determines whether to execute the received request based on the result of the above described (Steps S7 to S11) resource securing inquiry (Step S12). Details of the process as to whether to execute the received request as determined by the system control section 251 are described later.

On determining to execute the received copying request, the system control section 251 sets the synchronous control system to the reading control section 256, printing control section 258, and the image processing section 252 (Steps S13, S14, and S15). On setting the control system to the reading control section 256, printing control section 258, and the image processing section 252, the system control section 251 instructs the reading control section 256 to read the image data set (Step S16).

On receiving the instruction from the system control section 251, the reading control section 256 instructs the image processing section 252 to secure a resource. Specifically, the reading control section 256 instructs the image processing section 252 to secure a resource of the shared memory 151 required for inputting the image data set (Step S17). The image processing section 252 notifies the reading control section 252 of the result as to whether the shared memory 151 (resource) has been secured. On receiving the result, the reading control section 256 notifies the shared engine control section 255 the result as to whether the shared memory 151 has been secured (Step S18).

Provided that the share memory 151 has been secured in Step S18, the system control section 251 subsequently instructs the image processing section 252 to obtain the image data set (Step S19). The image processing section 252 then secures the resource (shared memory 151) required for the image conversion process (Step S20). The image processing section 252 then notifies the shared engine control section 255 that the resource required for the image conversion process has been secured (Step S21).

Subsequently, the system control section 251 instructs the printing control section 258 to obtain the image data set (Step S22). The printing control section 258 instructs the image processing section 252 to secure a resource. Specifically, the reading control section 256 instructs the image processing section 252 to secure the shared memory 151 required for printing the image data set (Step S23). The image processing section 252 notifies the printing control section 258 of the result as to whether the shared memory 151 (resource) has been secured. On receiving the result, the printing control section 258 notifies the shared engine control section 255 of the result as to whether the shared memory 151 has been secured (Step S24).

The system control section 251 according to the embodiment implements plural settings required for obtaining the image data set when the system control section 251 instructs the reading control section 256, the image processing section 252, and the printing control section 258 to obtain the image data sets (Steps S16, S19, S22). Details of the settings determined by the system control section 251 are described later.

On securing all the resources required for executing the copying request, the shared engine control section 255 instructs the reading control section 256 to obtain the image data set (Step S25). On receiving the instruction, the reading control section 256 instructs the scanner device 11 to scan the images (Step S26). The scanner device 11 scans the images of the document to obtain a scanned image data set (Steps S27, S28). The image data set scanned by the scanner device 11 is transferred to the image processing section 252 via the reading control section 256 (Steps S29, S30).

The image processing section 252 carries out the image conversion process on the received image data set into an image data set having the CMYK format that can be processed by copying processing (Step S31). On completing the image conversion process, the image processing section 252 transfers the image data set having the CMYK format to the printing control section 258 and instructs the printing control section 258 to output the transferred image data set (Step S32). The printing control section 258 transfers the image data set to the plotter device 12 to output the image data set (Step S33). The image forming apparatus 100 according to the embodiment of the invention executes the copying request in the aforementioned manner.

Accordingly, the image forming apparatus according to the embodiment of the invention executes a desired copying request after having secured all the resources required for executing the desired copying request. In this manner, the image forming apparatus according to the embodiment of the invention carries out the image conversion process by storing data in and retrieving data from the shared memory 151.

Figure 16:
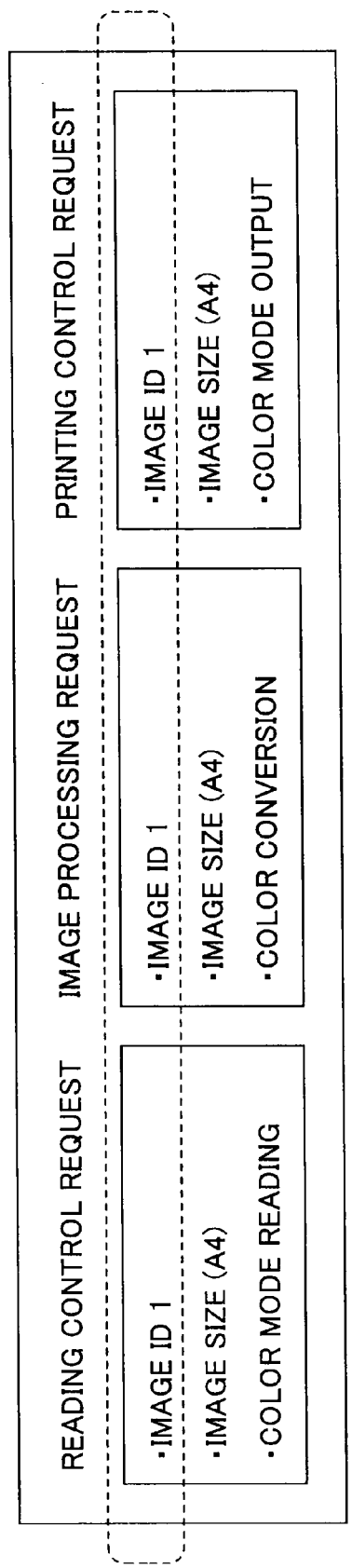
FIG. 16 is a diagram illustrating one example of a set of settings for a system control section in obtaining an image data set.

Referring now to FIG. 16, a process in which the system control section 251 obtains the image data set is described. FIG. 16 is a diagram illustrating settings for the system control section 251 when the image data set is obtained.

The system control section 251 according to the embodiment of the invention respectively sets a reading control request, an image processing request, and a printing control request to the reading control section 256, the image processing section 252, and the printing control section 258 when instructing these requests at Steps S16, S19, S19, and S22. At this moment, the system control section 251 provides identifiers identifying a type of the image data set (hereinafter called "image ID"), and associates the image ID with requests addressing to corresponding components (sections).

As the example in FIG. 16 shows, items of the reading control request set to the reading control section 256 include an image ID 1, an image size A4, and a color mode reading. Items of the image processing request set to the image processing section 252 include the image ID 1, the image size A4, and color conversion. Items of the printing control request set to the printing control section 258 include the image ID 1, the image size A4, and a color mode output.

As illustrated, the system control section 251 according to the embodiment of the invention is capable of setting the received requests (i.e., reading control request, image processing request, and printing control request) to the corresponding reading control section 256 controlling image data input, image processing section 252 carrying out the image conversion process, printing control section 258 controlling image data output all at once so as to execute the copying request (in this example, the copying request consists of the reading control request, image processing request, and printing control request). As described above, these settings are associated with the image ID. Thus, even if the image data set is divided into segments to be processed in the synchronous control system, each of the segments of the image data set can be received from or transferred to an appropriate filter.

In the system control section 251 according to the embodiment of the invention, in a case where the image data set is unable to output after having set the requests all at once, an input processing of the image data set is controlled by the reading control section 256 independently of other types of processing that are controlled by the image processing section 252 and the printing control section 258. In this case, the request for inputting the image (i.e., reading control request in FIG. 15) that has been set simultaneously with other requests is once cancelled independently.

For example, if the request is a copying request consisting of a reading control request, an image processing request, and a printing control request in this example and the printing control section 258 executes the copying request after having set the requests all at once but cannot print due to out-of-paper, the system control section 251 independently cancels the printing control request that has been set to the printing control section 258. Thereafter, the system control section 251 enables the reading control request set to the reading control section 256 and the image processing request set to the image processing section 252 to continue their processing.

Figure 17:
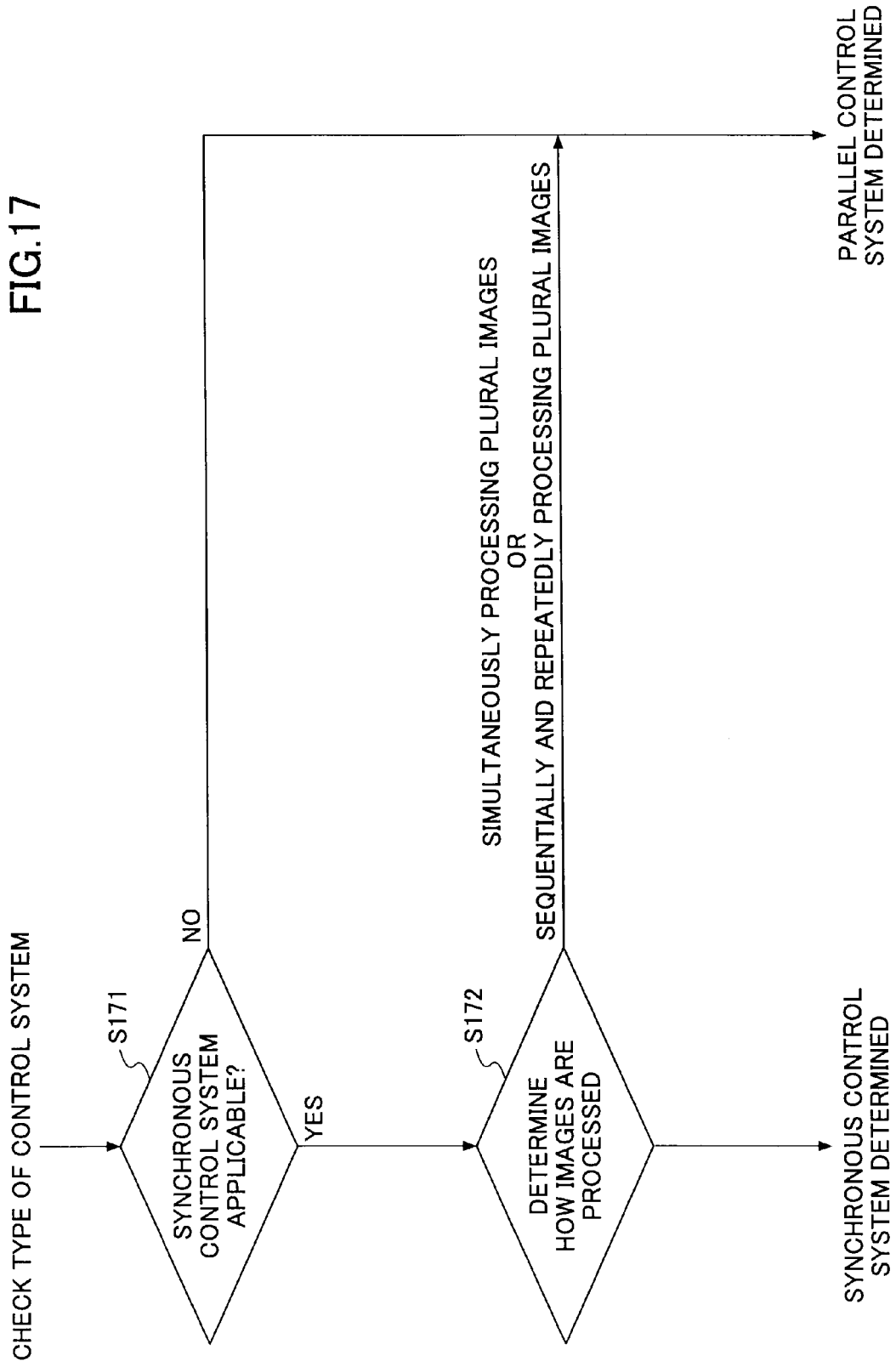
FIG. 17 is a flow chart illustrating a sequence of processes in which a type of a control system is determined.

Next, a process in which a type of a control system is determined is described with reference to FIG. 17 according to the embodiment of the invention. FIG. 17 is a flow chart illustrating a process in which a type of the control system is determined.

The system control section 251 receives the results of the inquiries from each of the reading control section 256, the image processing section 252, and the printing control section 258 about the type of control system to be applied, and determines whether the synchronous control system is applicable to each of the reading control section 256, the image processing section 252, and the printing control section 258 (Step S171). If the synchronous control system is applicable to all the reading control section 256, the image processing section 252, and the printing control section 258, the system control section 251 determines the synchronous control system to be applied as the control system at Step S171. However, if the parallel control system is applicable to one of the reading control section 256, or the image processing section 252, the system control section 251 determines the parallel control system to be applied as the control system at Step S171.

If the system control section 251 determines the synchronous control system as the control system, the system control section 251 examines in which types of the control system the image data set is processed (Step S172). Thereafter, the system control section 251 determines whether the synchronous control system is applicable based on the result at Step S172. The type of the control system for the image data set is determined by referring to the table T shown in FIG. 14.

If, for example, the system control section 251 causes the processing filter 245 to simultaneously process plural image data sets, the system control section 251 determines that the synchronous control system is inapplicable. As a result, the parallel control system is applied as the control system in this case. Likewise, if the system control section 251 causes the printing filter 246 to sequentially and repeatedly process plural image data sets, the system control section 251 determines that the synchronous control system is inapplicable. As a result, the parallel control system is applied instead of the synchronous control system in this case.

Figure 18:
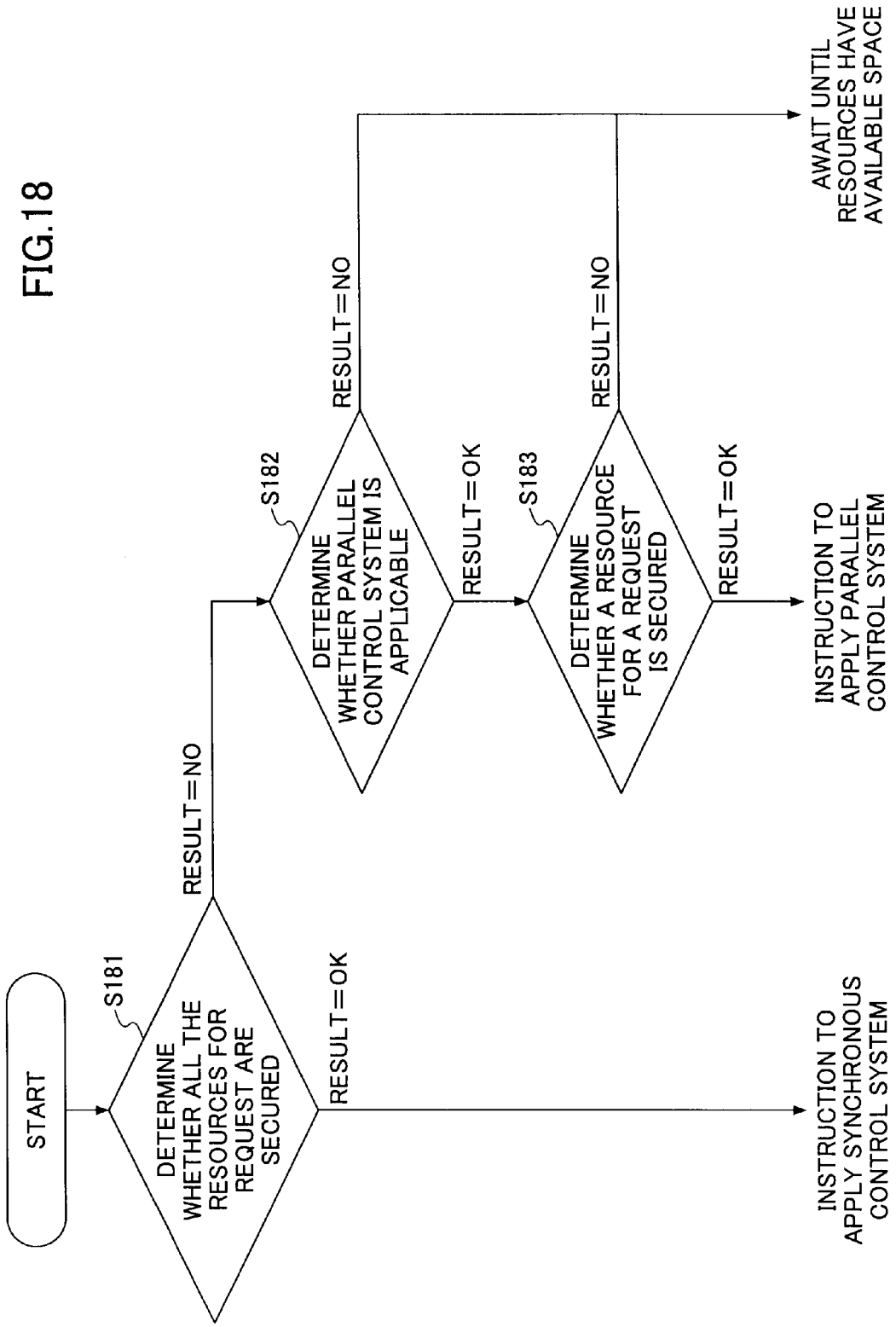
FIG. 18 is a flow chart illustrating a sequence of processes when execution of a request is determined.

Next, a description is given below regarding determining whether or not a request to be executed with reference to FIG. 18 according to the embodiment of the invention. FIG. 18 is a flow chart illustrating a process for determining whether to execute a request.

The system control section 251 determines whether all the resources required for executing a request (e.g., copying request) received by the image forming apparatus 100 (hereinafter "a received request") are secured (Step S181).

If all the resources required for executing the received request are secured at Step S181, the system control section 251 executes the received request (consisting of plural requests such as the reading control request, the image processing request, and the printing request) in the synchronous control system (i.e., executing the requests required for the received request all at once).

If, in contrast, not all the resources for executing the received request are secured at Step S181 but the received request is still initiated in the synchronous control system, the processing is suspended at the time at which one of the resources has failed to be secured. At this moment, the resource(s) already secured still remain allocated. Such resources may not be reallocated for executing another received request. Thus, another received request will not be executed even if components related to such particular request are operable.

In order to make such resources to be reallocated when one of the resources has failed to be secured, the system control section 251 determines whether the parallel control system is applicable (Step S182). When the reading control section 256 fails to secure a resource, the system control section 251 determines that the parallel control system is not applicable; thereby making the reading control section 256 to wait until the resource has been deallocated.

When the system control section 251 determines that the reading control section 256 can secure a resource (Step S183), the system control section 251 determines the type of the control system as the parallel control system to thereby execute the received request. In this case, the system control section 251 causes the document accumulation section 253 to store the image data set read by the reading control section 256 so that the stored image data set is processed after other resources have been deallocated.

According to the embodiment of the invention, since an input instruction or output instruction of the image data set received from hardware (e.g., scanner device 11, plotter device 12) triggers the execution of the received request, other types of requests can simultaneously be received. The received requests are enabled when the hardware is an executable state. For example, if the hardware is the scanner device 11, the executable state is defined as a state in which a polygon mirror is secured in the scanner device 11 and a document is transferred to and located at a starting position of scanning. If the hardware is the plotter device 12, the executable state is defined as a state in which the plotter device 12 is ready to form images and the transfer sheet (printer sheet) is transferred to and located at a starting position of image transferring.

According to the embodiment of the invention, the filters can operate independently of one another.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiment of the present invention has been described in detail, it should be understood that various changes, substitutions, and alterations could be made hereto without departing from the spirit and scope of the invention.

This patent application is based on Japanese Priority Patent Application No. 2008-237129 filed on Sep. 16, 2008, the entire contents of which are hereby incorporated herein by reference.

What is claimed is:

1. An image forming apparatus, comprising:
a plurality of input filter sections implemented by circuitry configured to control different types of input-processing performed by corresponding input devices to produce respective input image data sets each having a different input format;
a plurality of output filter sections implemented by the circuitry configured to control different types of output-processing performed by corresponding output devices that receive respective output image data sets each having a different output format;
an image processing sections implemented by the circuitry configured to be sharable by one of the input filter sections and one of the output filter sections, and to convert an image data set from an input format of the one of the input filter sections to an output format of the one of the output filter sections; and
a control section implemented by circuitry configured to simultaneously set an input control request, an image processing request, and an output control request, wherein each of the control requests include an associated image ID identifying a type of the image data set.

2. The image forming apparatus as claimed in claim 1, further comprising:
a shared storage medium configured to be shareable by at least one of the respective input image data sets each having the different input format and at least one of the respective output image data sets each having the different output format when the image processing section converts the image data set from the input format of the one of the input filter sections to the output format of the one of the output filter sections.

3. The image forming apparatus as claimed in claim 2, wherein
the control section is further configured to control at least one of the corresponding input devices and at least one of the corresponding output devices, and to activate the at least one of the corresponding input devices and the at least one of the corresponding output devices when the shared storage medium has available space.

4. The image forming apparatus as claimed in claim 3, wherein
the control section is further implemented by circuitry configured to determine a type of a control system to control the at least one of the corresponding input devices and the at least one of the corresponding output devices, and determines the type of the control system based on combinations of the plurality of input filter sections and the plurality of output filter sections.

5. The image forming apparatus as claimed in claim 4, wherein
the type of the control system is one of a first control system in which the at least one of the corresponding input devices is activated in synchronization with the at least one of the corresponding output devices and a second control system in which the at least one of the corresponding output devices is activated after the at least one of the corresponding input devices has been deactivated.

6. A method for forming an image in an image forming apparatus having a plurality of input filter sections implemented by circuitry configured to control different types of input-processing performed by corresponding input devices to produce respective input image data sets each having a different input format and a plurality of output filter sections implemented by circuitry configured to control different types of output-processing performed by corresponding output devices that receive respective output image data sets each having a different output format, the method comprising:
carrying out one of the different types of input-processing by a corresponding one of the input filter sections to produce an input image data set having a corresponding input format;
converting, by an image processing section implemented by circuitry, the input image data set from the corresponding input format of the one of the input filter sections to a requested output format of one of the output filter sections;
carrying out one of the different types of output-processing by a corresponding one of the output filter sections that receive an output image data set having the requested output format; and
simultaneously setting an input control request, an image processing request, and an output control request, wherein each of the control requests includes an associated image ID identifying a type of the image data set.

7. A non-transitory computer readable storage medium having instructions embedded therein which, when executed by one or more processors, cause the one or more processors to perform a method in an image forming apparatus having a plurality of input filter sections implemented by circuitry configured to control different types of input-processing performed by corresponding input devices to produce respective input image data sets each having a different input format and a plurality of output filter sections implemented by circuitry configured to control different types of output-processing performed by corresponding output devices that receive respective output image data sets each having a different output format, the method comprising:

carrying out one of the different types of input-processing by a corresponding one of the input filter sections to produce an input image data set having a corresponding input format;

converting, by an image processing section, the input image data set from the corresponding input format of the one of the input filter sections to a requested output format of one of the output filter sections;

carrying out one of the different types of output-processing by a corresponding one of the output filter sections that receive an output image data set having the requested output format; and simultaneously setting an input control request, an image processing request, and an output control request, wherein each of the control requests includes an associated image ID identifying a type of the image data set.

8. The image forming method as claimed in claim 6, further comprising:

making shareable a shared storage medium, by at least one of the respective input image data sets each having the different input format and at least one of the respective output image data sets each having the different output format when the image processing section converts the image data set from the input format of the one of the input filter sections to the output format of the one of the output filter sections.

9. The image forming method as claimed in claim 8, further comprising:

controlling at least one of the corresponding input devices and at least one of the corresponding output devices; and activating the at least one of the corresponding input devices and the at least one of the corresponding output devices when the shared storage medium has available space.

10. The image forming method as claimed in claim 9, further comprising:

determining a type of a control system to control the at least one of the corresponding input devices and the at least one of the corresponding output devices; and determining the type of the control system based on combinations of the plurality of input filter sections and the plurality of output filter sections.

11. The image forming method as claimed in claim 10, further comprising:

activating the at least one of the corresponding input devices in synchronization with the at least one of the corresponding output devices as a first type of control system; and activating the at least one of the corresponding output devices after the at least one of the corresponding input devices has been deactivated as a second type of control system.

12. The non-transitory computer readable storage medium as claimed in claim 7, further comprising:

making shareable a shared storage medium, by at least one of the respective input image data sets each having the different input format and at least one of the respective output image data sets each having the different output format when the image processing section converts the image data set from the input format of the one of the input filter sections to the output format of the one of the output filter sections.

13. The non-transitory computer readable storage medium as claimed in claim 12, further comprising:

controlling at least one of the corresponding input devices and at least one of the corresponding output devices; and activating the at least one of the corresponding input devices and the at least one of the corresponding output devices when the shared storage medium has available space.

14. The non-transitory computer readable storage medium as claimed in claim 13, further comprising:

determining a type of a control system to control the at least one of the corresponding input devices and the at least one of the corresponding output devices; and determining the type of the control system based on combinations of the plurality of input filter sections and the plurality of output filter sections.

15. The non-transitory computer readable storage medium as claimed in claim 14, further comprising:

activating the at least one of the corresponding input devices in synchronization with the at least one of the corresponding output devices as a first type of control system; and activating the at least one of the corresponding output devices after the at least one of the corresponding input devices has been deactivated as a second type of control system.

16. The image forming apparatus as claimed in claim 1, wherein the control section is further implemented by circuitry configured to acquire the associated image ID prior to setting the input control request, the image processing request, and the output control request.

* * * * *